(12) United States Patent
Tung et al.

(10) Patent No.: US 8,523,554 B2
(45) Date of Patent: Sep. 3, 2013

(54) THREE-DIMENSIONAL OBJECT-FORMING APPARATUS

(75) Inventors: Ya Ching Tung, Hsin-Chu (TW); Kwo Yuan Shi, Hsin-Chu (TW)

(73) Assignee: Microjet Technology Co., Ltd., Hsin-Chu (TW)

( * ) Notice: Subject to any disclaimer, the term of this patent is extended or adjusted under 35 U.S.C. 154(b) by 91 days.

(21) Appl. No.: 13/150,913

(22) Filed: Jun. 1, 2011

(65) Prior Publication Data

US 2011/0300248 A1  Dec. 8, 2011

(30) Foreign Application Priority Data

Jun. 2, 2010 (CN) ...................... 2010 2 0221206 U

(51) Int. Cl.
*B28B 17/00* (2006.01)

(52) U.S. Cl.
USPC ........... 425/217; 425/169; 425/375; 425/225; 425/90; 425/130; 264/308; 264/37.29; 222/233

(58) Field of Classification Search
USPC ................ 425/174.4, 169, 375, 73, 74, 210, 425/225, 217, 90, 93, 216, 130, 215; 264/497, 264/308, 113, 37.29, 101; 118/712, 66, 602, 118/600, 308, 309, 313, 314, 315, 316; 222/409, 414, DIG. 1, 233, 238, 367, 361, 222/336, 354, 355, 216, 303, 369, 412, 413; 141/8, 98; 366/329.1, 329.2
See application file for complete search history.

(56) References Cited

U.S. PATENT DOCUMENTS

| | | | | | |
|---|---|---|---|---|---|
| 2,161,190 | A | * | 6/1939 | Paull | 222/252 |
| 5,902,537 | A | * | 5/1999 | Almquist et al. | 264/401 |
| 6,175,422 | B1 | * | 1/2001 | Penn et al. | 358/1.1 |
| 6,375,874 | B1 | * | 4/2002 | Russell et al. | 264/28 |
| 6,932,935 | B1 | * | 8/2005 | Oberhofer et al. | 264/497 |
| 2002/0079601 | A1 | * | 6/2002 | Russell et al. | 264/40.1 |
| 2004/0118309 | A1 | * | 6/2004 | Fedor et al. | 101/480 |
| 2005/0280185 | A1 | * | 12/2005 | Russell et al. | 264/308 |
| 2006/0204603 | A1 | * | 9/2006 | Leuterer et al. | 425/174.4 |
| 2009/0206522 | A1 | * | 8/2009 | Hein et al. | 264/497 |
| 2010/0247742 | A1 | * | 9/2010 | Shi et al. | 427/8 |
| 2011/0215117 | A1 | * | 9/2011 | Huang et al. | 222/233 |

* cited by examiner

*Primary Examiner* — Yogendra Gupta
*Assistant Examiner* — Ninh Le
(74) *Attorney, Agent, or Firm* — Muncy, Geissler, Olds & Lowe, PLLC

(57) ABSTRACT

A three-dimensional object-forming apparatus is disclosed, which includes an in-batches powder-rationing tank system, a construction tank system, a printing powder-applying system, a rapid drying heating system, a printing maintenance device, a dust-proof device, a successive liquid-supplying device, a powder auto-filtrating and recycling device, and a print quality detection device.

20 Claims, 24 Drawing Sheets

THREE-DIMENSIONAL OBJECT-FORMING APPARATUS

BACKGROUND OF THE INVENTION

1. Field of the Invention

The present invention is relates to a three-dimensional object-forming apparatus.

2. Description of Related Art

Rapid prototyping (RP) is developed according to the concept of a laminating process for forming pyramids. The technical feature of the rapid prototyping is rapid shaping, and transforming designed programs with complex configurations into three-dimensional (3D) models automatically and rapidly without using any cutting tools, molds and fixtures. Hence, the rapid prototyping can greatly reduce the study times and the research costs of new products, and ensure the time-to-market and the first-time success rate of the new products. The rapid prototyping is a more complete and conventional tool of product design for technical personnel to introduce new products to other technical personnel and non-technical personnel such as an enterprise's decision makers and users. Therefore, it is possible to increase the competitiveness of the products on the market and the rapid response of enterprises to the market.

Currently, the rapid prototyping technique generates 3D models by combining printing techniques and precise positioning carrier techniques. The process comprises the following steps: spreading a layer of powder on a carrier, printing an adhesive with high viscosity on parts of the powder through an ink-jet printing process to make the adhesive and the powder stick together and solidify, and repeating the aforementioned steps to laminate layer by layer to obtain a 3D model.

However, the printing heads of the printing apparatus generally used in the rapid prototyping technique are not sealed, when the ink-jet printing process is not being carried out. Hence, the remaining adhesive may dry on the printing heads or in the storage tank. The dried adhesive residue may impair the subsequent operation of the printing apparatus, and hence the benefits of the system cannot be ensured.

The rapid prototyping technique is known as the fastest molding technique currently available. However, no matter what the mold's size is or how the apparatus is modified, several, even tens of hours are spent to obtain a 3D model. In addition, when the printing head is blocked and the blocked printing head is not found or determined timely during the process of lamination, significant amounts of time and materials are wasted.

Additionally, the printing rate of spraying the printing adhesive with high viscosity is 8 m/s during the process of spraying the printing adhesive to form the model. At the instant that the droplets of the printing adhesive adhere to the powder, the nano-sized powder grains not adhered to the droplets may float in the air due to turbulence arising from the high printing rate. Furthermore, during the process of powder supply and object formation, the powder may also circulate in the air when the lamination of the powder is delivered. Besides, the conventional apparatus does not comprise a quantitative powder-supplying device, so the remaining powder has to be delivered back into the recycle tank. During delivering of the remaining powder, the powder may descend inappropriately, causing pollution as well as waste of energy. Furthermore, excessive time is spent after each powder-spreading step and several hours have to be spent waiting for the completed model to dry. If the strength of the model is insufficient or the model is not taken out properly, damage may occur thereto. Only when the model is strong enough, it can be taken out, and this results in inability to achieve the purpose of rapid prototyping.

Therefore, there is an urgent need to develop a three-dimensional object forming apparatus to obviate the aforementioned problems in the art.

SUMMARY OF THE INVENTION

The object of the present invention is to provide a three-dimensional object-forming apparatus, which has a quantitative powder-supplying tank system to regulate the corresponding times between the cavities of the in-batches rationing roller under rolling and the dropping-powder opening according to requirements of different powder-application thicknesses so as to control the output amount of the construction powder. Therefore, redundant construction powder drawn in the powder collection tank can be reduced to avoid the waste of the construction powder and decrease the production costs. In addition, each cavity of the in-batches rationing roller has a plurality of compartments, and the capacity of the compartments increases from the center of the cavities to the both sides thereof so as to achieve even powder application and improve the drawback of powder deficiency at the both sides.

Besides, the three-dimensional object-forming apparatus of the present invention further comprises a heating device used to heat during the printing of the printing module to accelerate the combination between the adhesive and the construction powder and reduce one-third to half time of forming a three-dimensional object. The three-dimensional object-forming apparatus of the present invention further comprises a successive liquid-supplying device which can successively supply an adhesive into the printing cartridge to make the printing module inkjet-print on the construction powder for a long term of time.

Furthermore, the three-dimensional object-forming apparatus of the present invention has a dust-proof device for a driving component to prevent the contamination of the disturbed powder during the powder application and inkjet printing so that the apparatus and components of the three-dimensional object-forming apparatus all can be kept anytime in a normal operation and achieve absolute dust-proofing overall.

Meanwhile, the three-dimensional object-forming apparatus of the present invention is provided with an inkjet-print head maintenance device which comprises a cleaning unit and a sealing unit. After the inkjet-printing operation is completed by the inkjet-print head, the inkjet-print head can be completely cleaned by the scrapers of the cleaning unit and sealed in the sealing part of the sealing unit to achieve thorough anti-contamination and anti-drying of the inkjet-print head.

Moreover, the three-dimensional object-forming apparatus of the present invention has the design of the print quality detection, in which ground glass is used as a print quality detection member to real-timely observe whether the pattern inkjet-printed by the inkjet-print head is normal and determine whether the inkjet-print head is blocked so as to clean the inkjet-print head in time and keep the print quality.

In order to achieve the abovementioned objects, a generalized aspect of the present invention provides a three-dimensional object-forming apparatus comprising an in-batches powder-rationing tank system, a construction tank system, a printing powder-applying system, a rapid drying heating system, a printing maintenance device, a dust-proof device, a successive liquid-supplying device, a powder auto-filtrating and recycling device, and a print quality detection device.

DETAILED DESCRIPTION OF THE PREFERRED EMBODIMENT

Several typical embodiments showing the features and advantages of the present invention are explained in relation in the following paragraphs, and it is to be understood that many other possible modifications and variations can be made without departing from the spirit and scope of the invention as hereinafter claimed.

Figure 1:
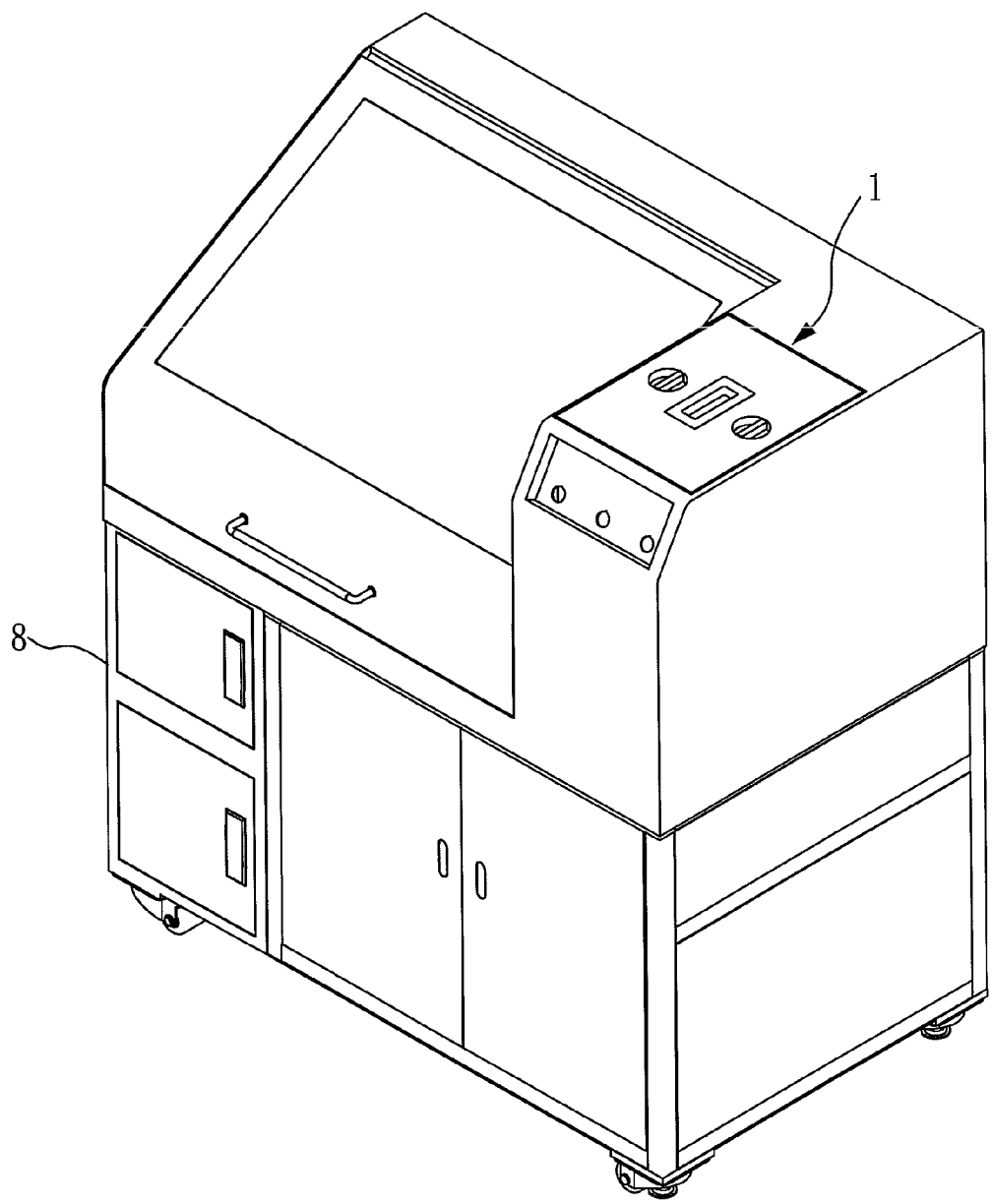
FIG. 1 shows an exterior view of the three-dimensional object-forming apparatus in the preferred example of the present invention.
Figure 2:
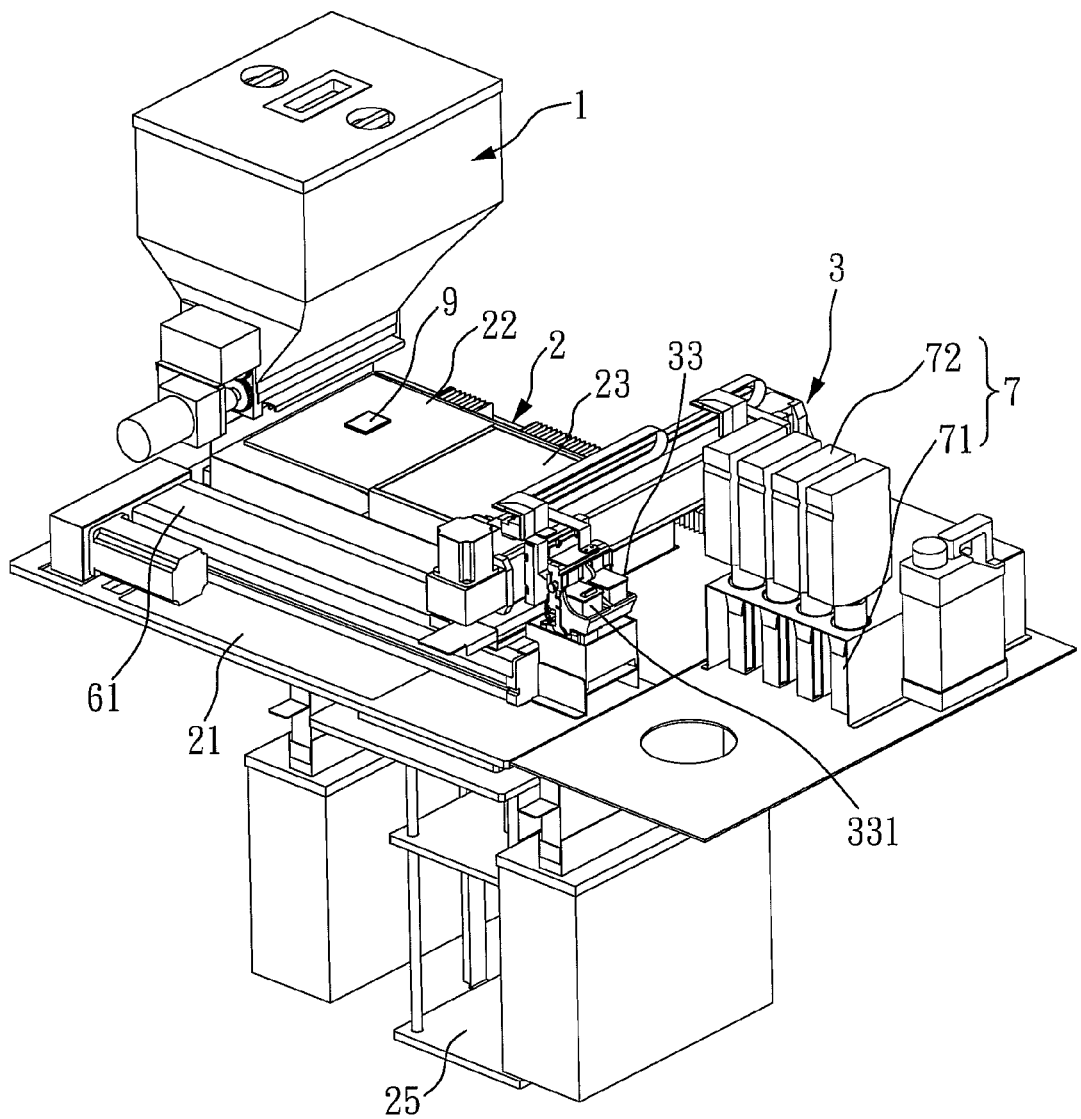
FIG. 2 shows an interior view of the three-dimensional object-forming apparatus in the preferred example of the present invention.

With reference to FIGS. 1 and 2, they are exterior and interior views of the three-dimensional object-forming apparatus in a preferred example of the present invention. As shown in FIGS. 1 and 2, the three-dimensional object-forming apparatus of the present invention mainly includes an in-batches powder-rationing tank system 1, a construction tank system 2, a printing powder-applying system 3, a rapid drying heating system 4 (shown in FIG. 5C), a printing maintenance device 5 (shown in FIG. 7A), a dust-proof device 6 (shown in FIG. 6), a successive liquid-supplying device 7 (shown in FIG. 8), a powder auto-filtrating and recycling device 8 (shown in FIG. 9), and a print quality detection device 9.

The in-batches powder-rationing tank system 1 and the construction tank system 2 of the present invention are provided in view of that there is no in-batches powder-rationing device in the conventional rapid-forming apparatus and it causes the uneven density and redundant powder drawn in the trihedral auto-recycling tub resulting in uneven powder application. Therefore, an in-batches rationing roller and a trihedral auto-recycling tub are installed in the powder-supplying system to overcome the abovementioned drawbacks. How to overcome the drawbacks is the main topic of developing the in batches powder-rationing tank system 1 and the construction tank system 2 of the present invention. The following are illustrations of the related components.

Figure 3A:
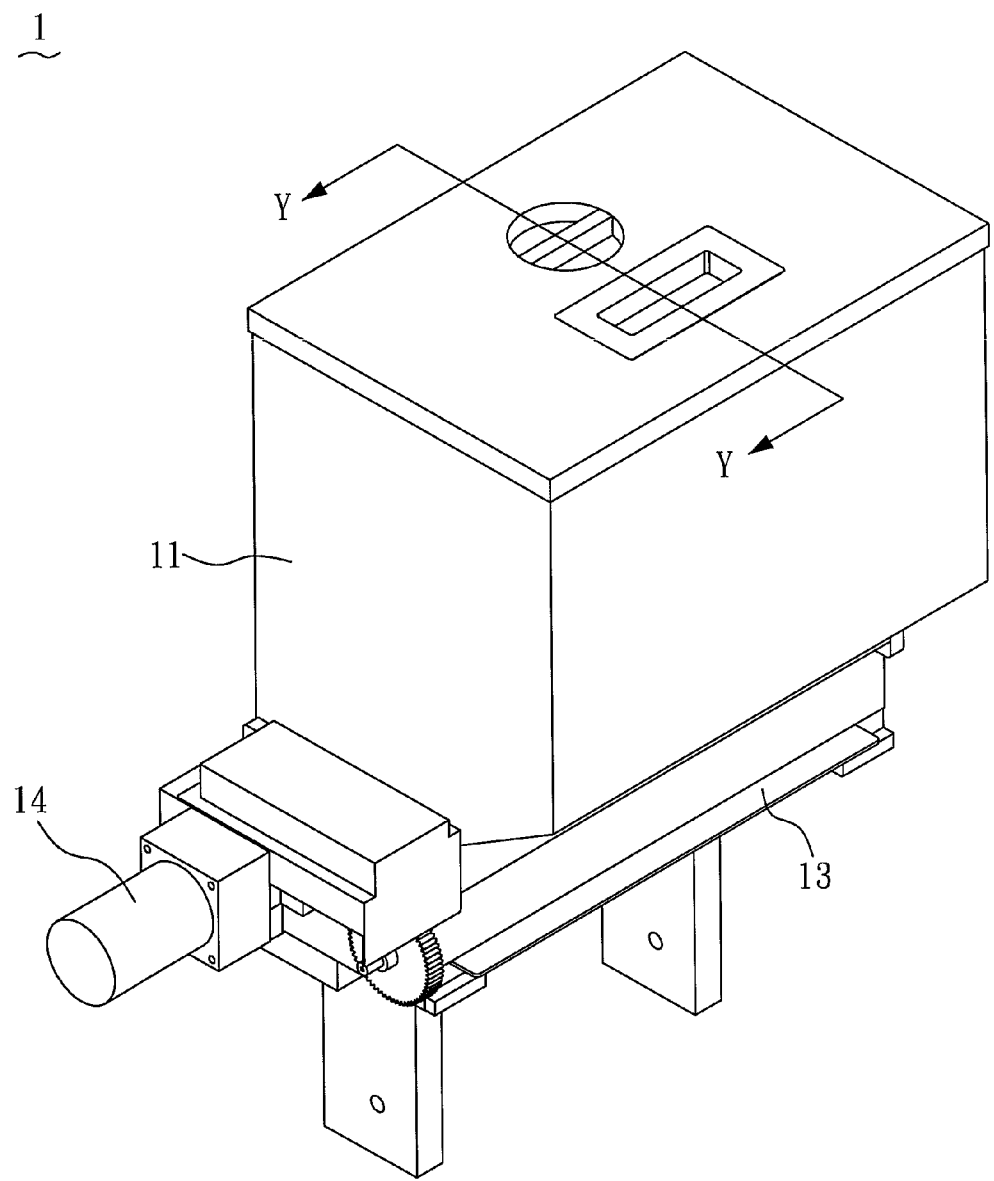
FIG. 3A shows a structural view of the quantitative powder-supplying tank system.
Figure 3B:
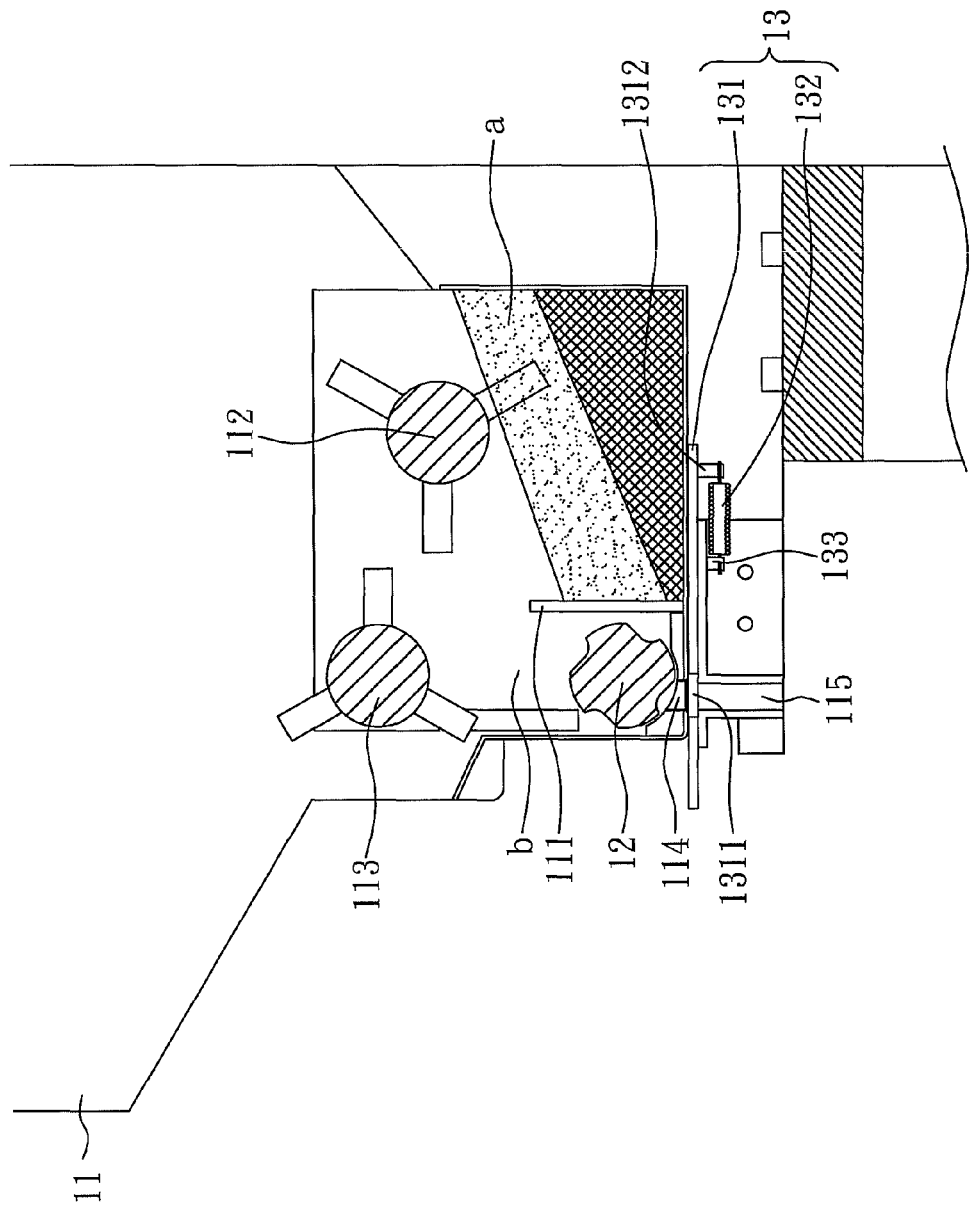
FIG. 3B shows a Y-Y cross-sectional view of FIG. 3A.

With reference FIGS. 3A and 3B, FIG. 3A shows a structural view of the in-batches powder-rationing tank system in a preferred example of the present invention, and FIG. 3B shows a Y-Y cross-sectional view of FIG. 3A. As shown in FIGS. 3A and 3B, the in-batches powder-rationing tank system 1 includes at least one powder-supplying tank 11, an in-batches rationing roller 12, and a closing device 13. The powder-supplying tank 11 is a hollow tank structure and used for storage of the construction powder "a". Within the powder-supplying tank 11, a baffle plate 111, a first roller 112, and a second roller 113 are installed. Additionally, a dropping-powder opening 114 and a dropping-powder channel 115 are disposed on the bottom of the powder-supplying tank 11. A lateral of the baffle plate 111 and the dropping-powder opening 114 are separated by a dropping-powder zone "b". The construction powder "a" accumulated outside the dropping-powder zone "b" of the baffle plate 111 can be disturbed by the first roller 112 and then drop within the dropping-powder zone "b" of the baffle plate 111 by the rotation of the second roller 113.

Figure 3C:
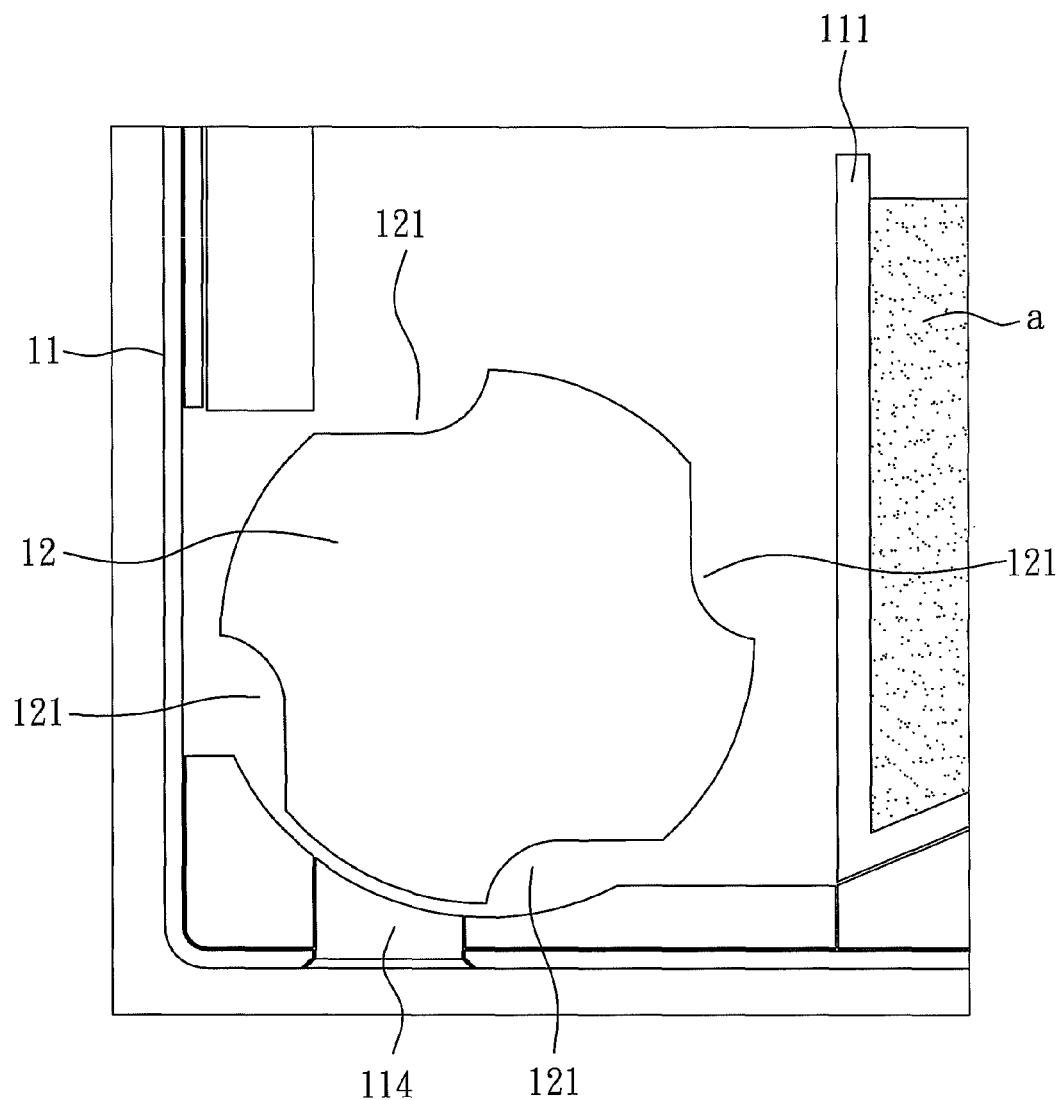
FIG. 3C shows a structural view of the partial powder-supplying tank and in-batches rationing roller in FIG. 3B.
Figure 3D:
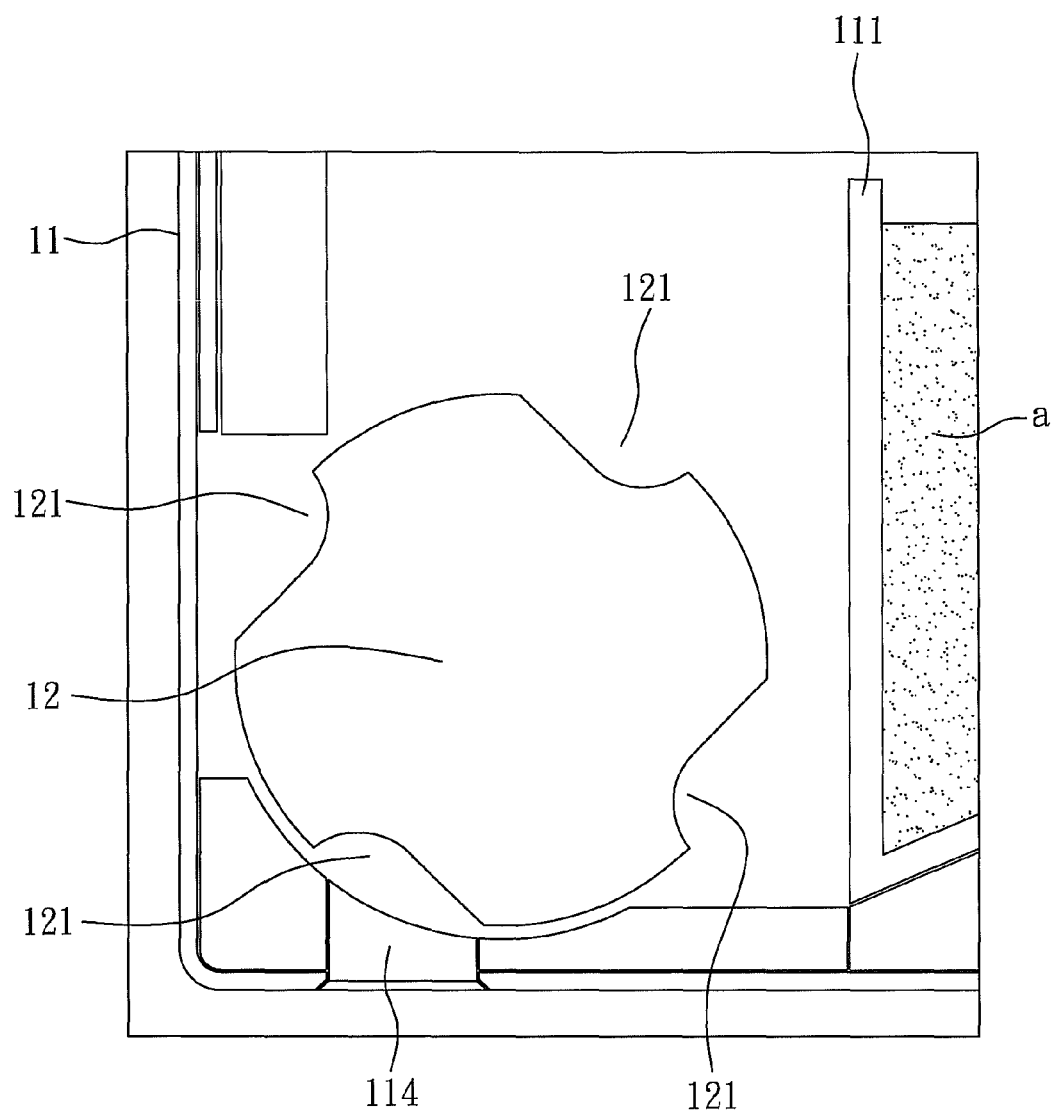
FIG. 3D shows a structural view of supplying powder in FIG. 3B.

With reference to FIGS. 3C and 3D, they are partially structural views of the powder-supplying tank and the in-batches rationing roller in FIG. 3B. As shown in FIGS. 3C and 3D, the in-batches rationing roller 12 is installed in the dropping-powder zone "b" of the powder-supplying tank 11, close to the dropping-powder opening 114, used to supply the construction powder "a" in batches required for total application of a construction-forming area, and has a plurality of cavities 121. Each cavity 121 is mainly used to receive the construction powder "a". When the cavities 121 of the in-batches rationing roller 12 do not correspond to the dropping-powder opening 114, the construction powder "a" can not be output (as shown in FIG. 3C). On the contrary, when one of the cavities 121 corresponds to the dropping-powder opening 114, the construction powder "a" contained in the powder-supplying tank 11 are output via the dropping-powder opening 114 (as shown in FIG. 3D).

Besides, in the in-batches powder-rationing tank system 1 of the present invention, the corresponding times between the cavities 121 of the in-batches rationing roller 12 under rolling and the dropping-powder opening 114 can be regulated by a motor 14 according to the requirements of different powder application thicknesses so as to control the output amount of the construction powder "a" to avoid the waste of the construction powder "a". For example, if the powder application thickness of the construction-forming area has the maximum of 0.12 mm and the minimum of 0.08 mm. The amount of the construction powder "a" received in a cavity 121 of the in-batches rationing roller 12 approximately forms a thickness of 0.04 mm. Therefore, when the construction powder "a" is formed in a thickness of 0.08 mm, the motor 14 has to rotate twice to make two cavities 121 of the in-batches rationing roller 12 connect to the dropping-powder opening 114 and thus the construction powder "a" received in the cavities 121 can be output via the dropping-powder opening 114. When the construction powder "a" is formed in a thickness of 0.12 mm, the motor 14 has to rotate three times to make three cavities 121 of the in rationing roller 12 cannot to the dropping-powder opening 114 and thus the construction powder "a" received in the cavities 121 can be output via the dropping-powder opening 114. Accordingly, the redundant construction powder "a" drawn into a powder collection tank can be reduced.

Figure 3E:
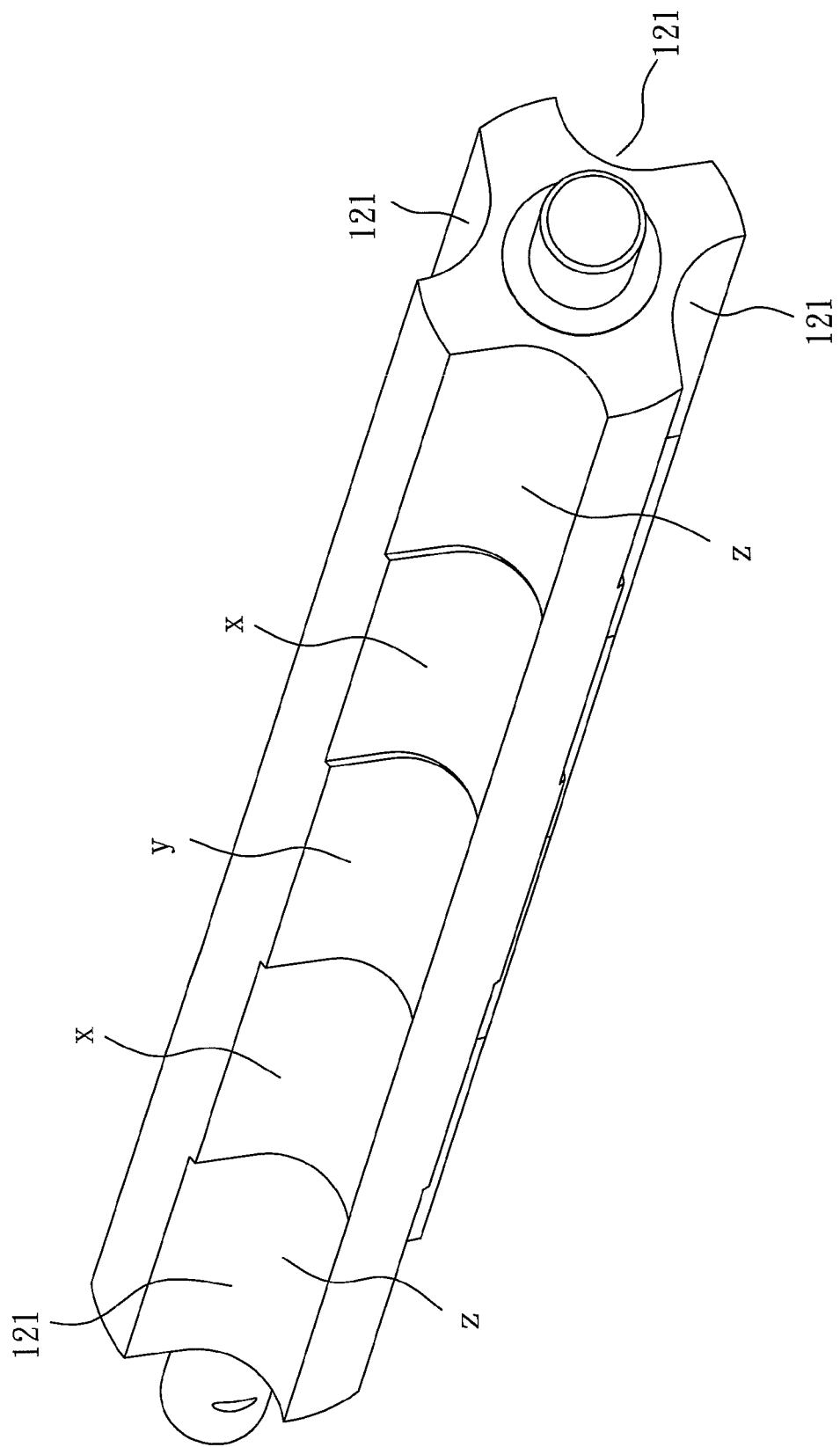
FIG. 3E shows a structural view of the in-batches rationing roller in FIG. 3B.
Figure 3F:
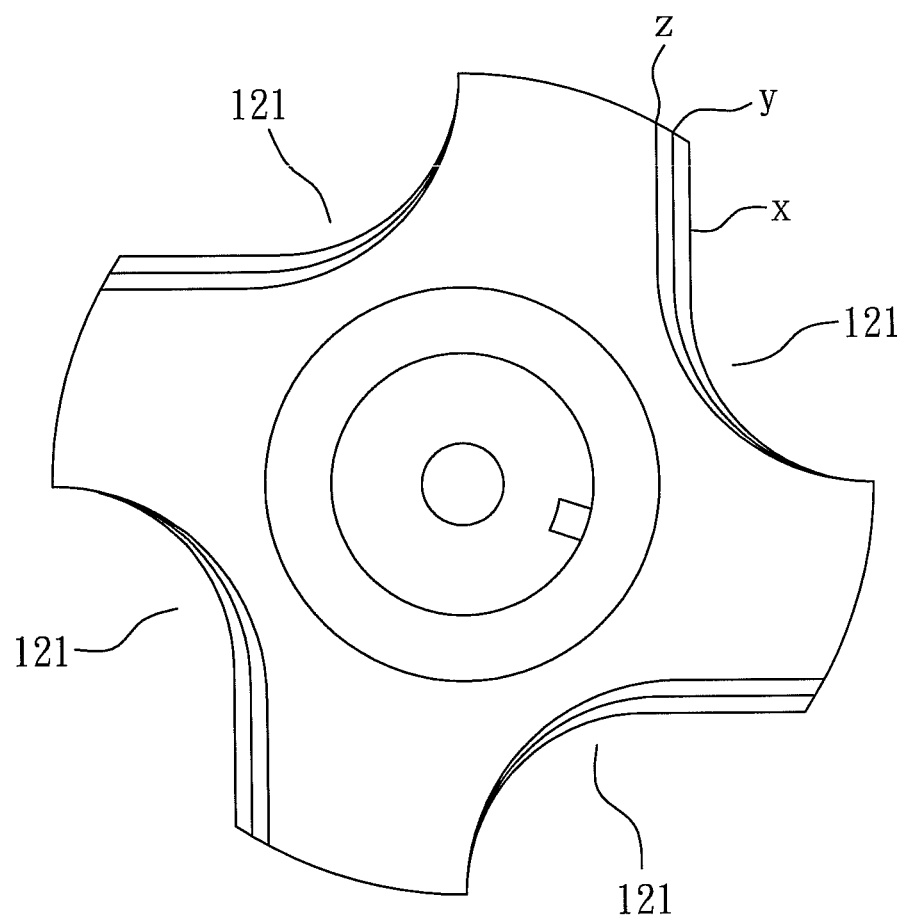
FIG. 3F shows a front view of the in-batches rationing roller in FIG. 3B.

With reference to FIGS. 3E and 3F, they are structural and front views of the in-batches rationing roller shown in FIG. 3B. As shown in FIGS. 3E and 3F, each cavity 121 of the in-batches rationing roller 12 of the present invention has a plurality of compartments "x", "y", and "z". In the present example, one compartment "x", two compartments "y", and two compartments "z" are contained in each cavity 121, but not limited thereto. The compartment "x" is set in the center of the cavities 121 and both sides of the compartment "x" are provided respectively with the compartments "y". The compartments "z" are set at the other side of the compartments "y". The cavities of the compartment "x" are shallowest and have the least amount of the received powder. The cavities of the compartments "y" are deeper and have more amount of the received powder than those of the compartment "x". The cavities of the compartments "z" are deeper than those of the compartment "x" and the compartments "y" and thus have the largest amount of the received powder. In other words, the amount of the received powder in one compartment "x" and plural compartments "y" and "z" increase from the center to the both sides of the cavities 121, i.e. compartment "x"<compartments "y"<compartments "z". Based on the structural designs that each cavity 121 has one compartment "x" and plural compartments "y" and "z" and the capacity of one compartment "x" and plural compartments "y" and "z" increases from the center of the cavities 121 to the both sides thereof, the construction powder "a" can be applied evenly on the construction-forming area so as to overwhelm the drawbacks of more and more differences of the construction powder amounts between the center and the both sides in the conventional technique as the times of the powder application increase.

Figure 3G:
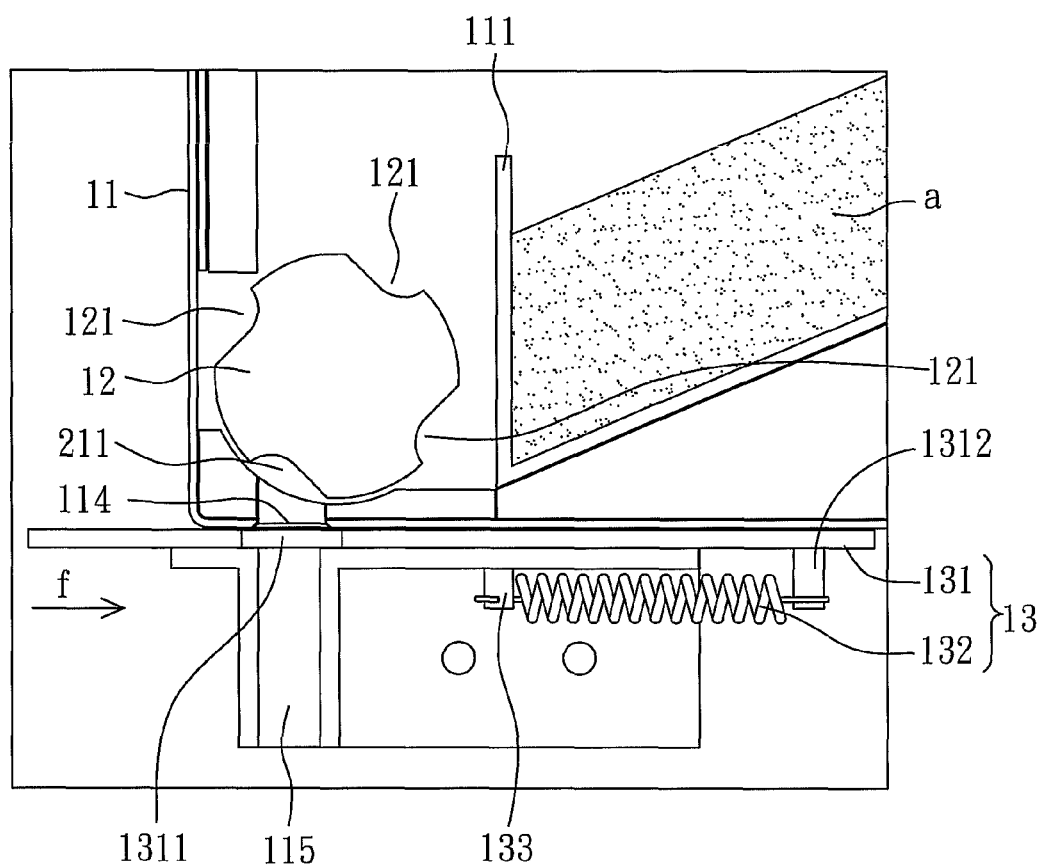
FIG. 3G is a structural view of the closing device and dropping-powder channel shown in FIG. 3B.

With reference to FIG. 3G, it is a structural view of the closing device and dropping-powder channel shown in FIG. 3B. As shown in FIG. 3G, the closing device 13 included in the in-batches powder-rationing tank system 1 of the present invention has a board 131, an elastic member 132, and a retention member 133. The board 131 is movable and has an opening 1311 and a fixing member 1312. An end of the elastic member 132 is connected to the fixing member 1312, and the other end thereof is connected to the retention member 133 mounted on the bottom of the powder-supplying tank 11. During the powder supply of the powder-supplying tank 11, the board 131 of the closing device 13 is moved by a thrust towards the direction "f" and thus the opening 1311 thereof is connected to the dropping-powder opening 114. At this instance, the construction powder "a" received in one cavity 121 of the in-batches rationing roller 12 is output via the dropping-powder opening 114, the opening 1311, and the dropping-powder channel 115 (as shown in FIG. 3G).

Figure 3H:
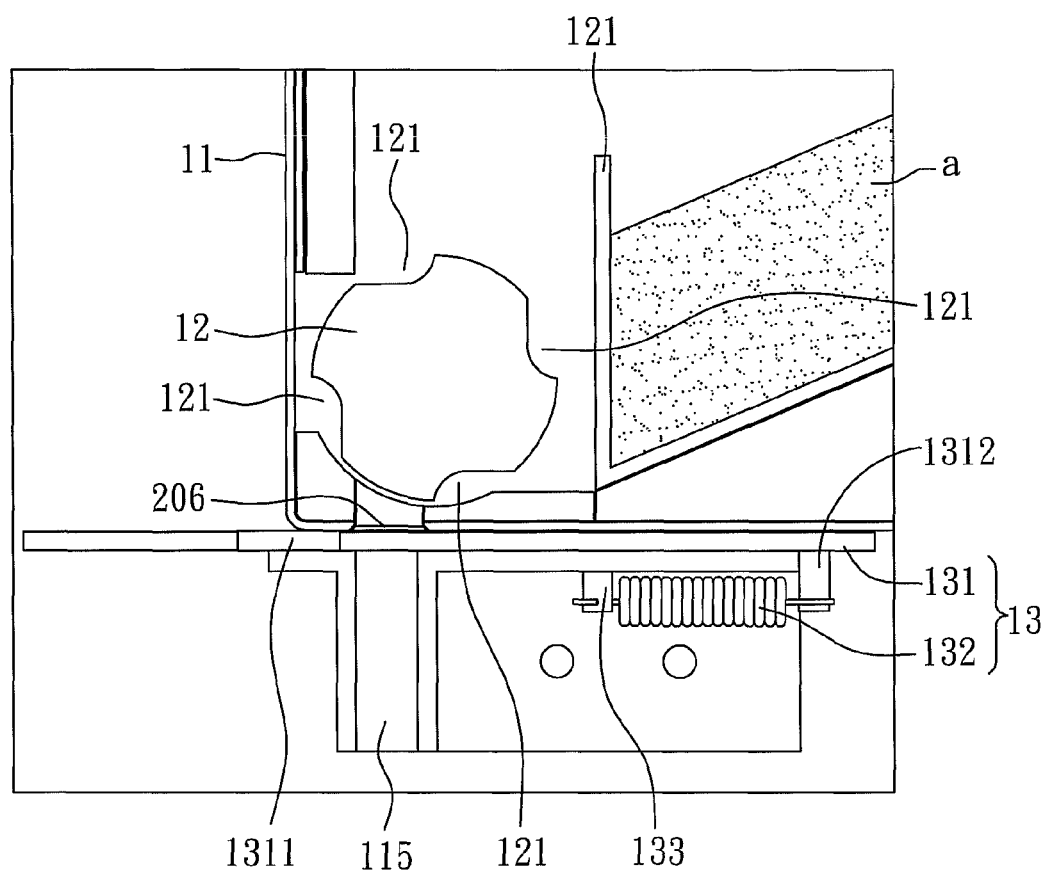
FIG. 3H shows a structural view of the opening of the closing device unconnected to the dropping-powder opening shown in FIG. 3G.

On the contrary, when the powder supply of the powder-supplying tank 11 is completed, the board 131 of the closing device 13 is not moved by the thrust. At this instance, the board 131 is displaced by the elastic recovery force of the elastic member 132 and moved towards the direction opposite to the direction "f". Hence, the opening 1311 of the board 131 is unconnected to the dropping-powder opening 114 (as shown in FIG. 3H) to avoid the dropping of the powder. Accordingly, when the three-dimensional object-forming apparatus is under operation, the closing device 13 can actually prevent the leakage of the minor construction powder "a" from the inside of the powder-supplying tank 11 so as to prevent the contamination of working environments.

In addition, the in-batches powder-rationing tank system 1 of the present invention provides several choices of the thickness of the powder application and the amount of the printing powder, and optimizes a suitable ratio thereof to inkjet-print. The in-batches rationing roller 12 can efficiently solve the drawback of the powder deficiency at the both sides in the powder application of the conventional technique. Although the conventional technique overcomes the drawback by supplying more powder to complement the powder at the both sides, this incurs another shortcoming of a large consumption of the powder. By contrast, the present invention can efficiently improve the abovementioned.

The construction tank system 2 of the present invention is designed to accurately control the thickness of the powder application, and the motor is used to control the thickness of the powder in a range of 0.08-0.12 mm to achieve a perfect size of rapid prototyping machine. Also, the present invention focuses on the surrounding design of the powder-dropping machinery and thus powder can be auto-recycled peripherally when the product is taken out so as to improve the conventional drawback of that the dropping powder is recycled only at a single side.

Figure 4A:
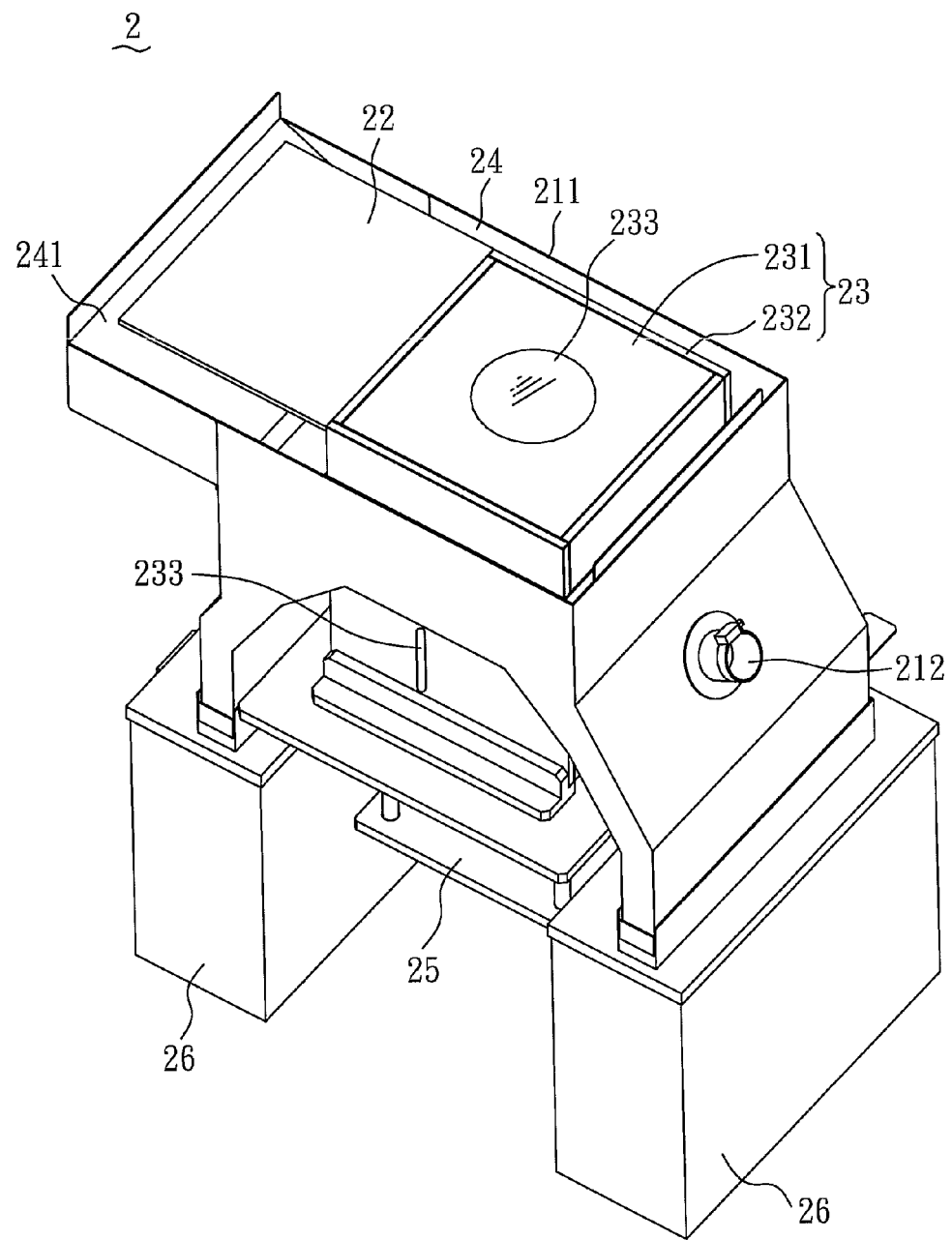
FIG. 4A shows a structural view of the construction tank system.

With reference to FIG. 4A, it shows a structural view of the partial construction tank system. As shown in FIGS. 2 and 4A, the construction tank system 2 includes a base platform 21 (as shown in FIG. 2), a powder-loading platform 22, a construction-forming area 23, a surrounding dropping-powder area 24, an elevator apparatus 25, and a remaining powder auto-collection area 26. The construction-forming area 23 is defined simultaneously by the construction platform 231 and the construction tank body 232. The construction platform 231 is used to carry the construction powder "a" and the 3D object laminated layer by layer, and mounted on the elevator apparatus 25. The construction platform 231 can be moved up and down inside the construction tank body 232 by the elevator apparatus 25. During the printing, after a layer is inkjet-printed or a determined thickness is formed, the construction platform 231 is moved down inside the construction tank body 232 by the elevator apparatus 25 until a 3D object is totally formed. Then, the construction platform 231 is moved up by the elevator apparatus 25 to remove the redundant powder and take out the product. Besides, a detection window 233 is installed on the construction platform 231 and the side wall of the construction tank body 232 in the construction-forming area 23, respectively. The detection window 233 is made of a transparent material such as glass or acrylic plates for observing whether the accumulation of the waste powder on the elevator apparatus 25 (the waste powder is a minor leakage of the powder resulted from a tiny gap formed between the side wall of the construction tank body 232 and the construction platform 231 for a long-term use) damages of the components in the elevator apparatus 25 or influences the accuracy thereof so as to benefit the cleaning by a maintenance user.

The surrounding dropping-powder area 24 is set around the powder-loading platform 22 and the construction-forming area 23, and defined by the side wall 211 of the base platform 21 and the space between the powder-loading platform 22 and the construction-forming area 23. The surrounding dropping-powder area 24 is used to collect the remaining powder and can further include plural incline structures 241 for a benefit to drop the remaining powder in the remaining powder auto-collection area 26 along the inclines and also to prevent the direct dropping of the powder from disturbance.

Figure 4B:
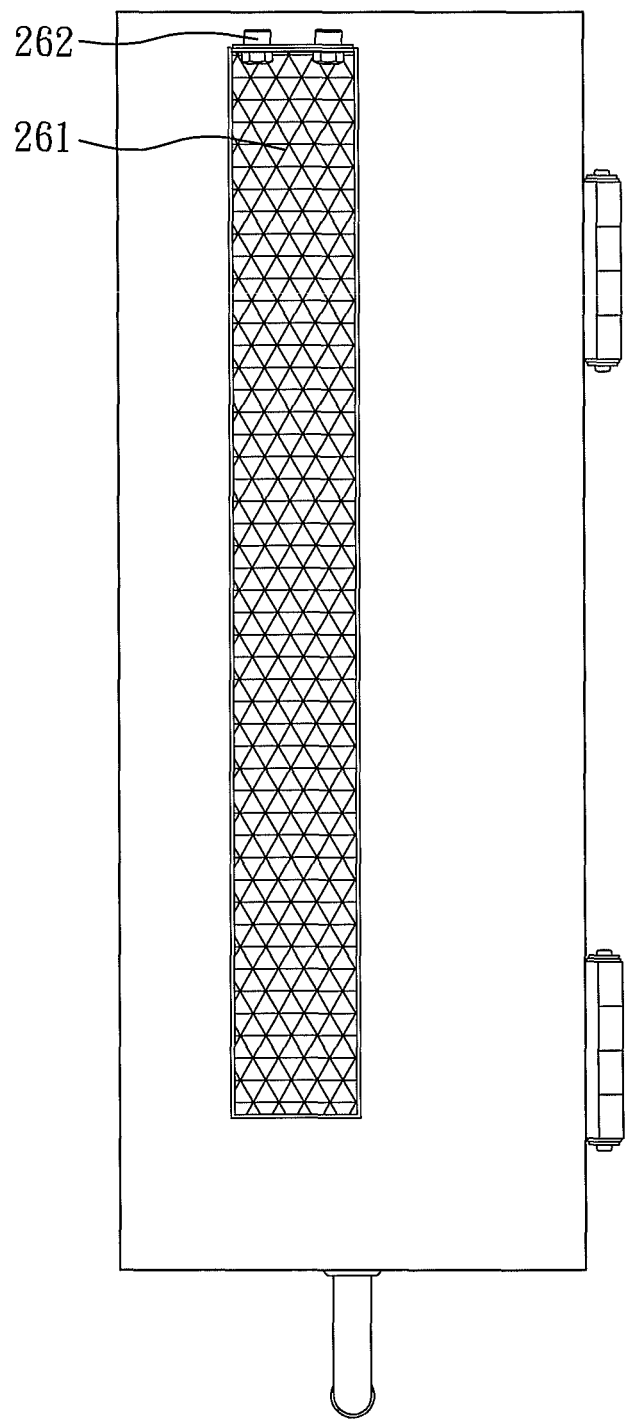
FIG. 4B shows a structural view of the partial remaining powder auto-collection area of the construction tank system.
Figure 4C:
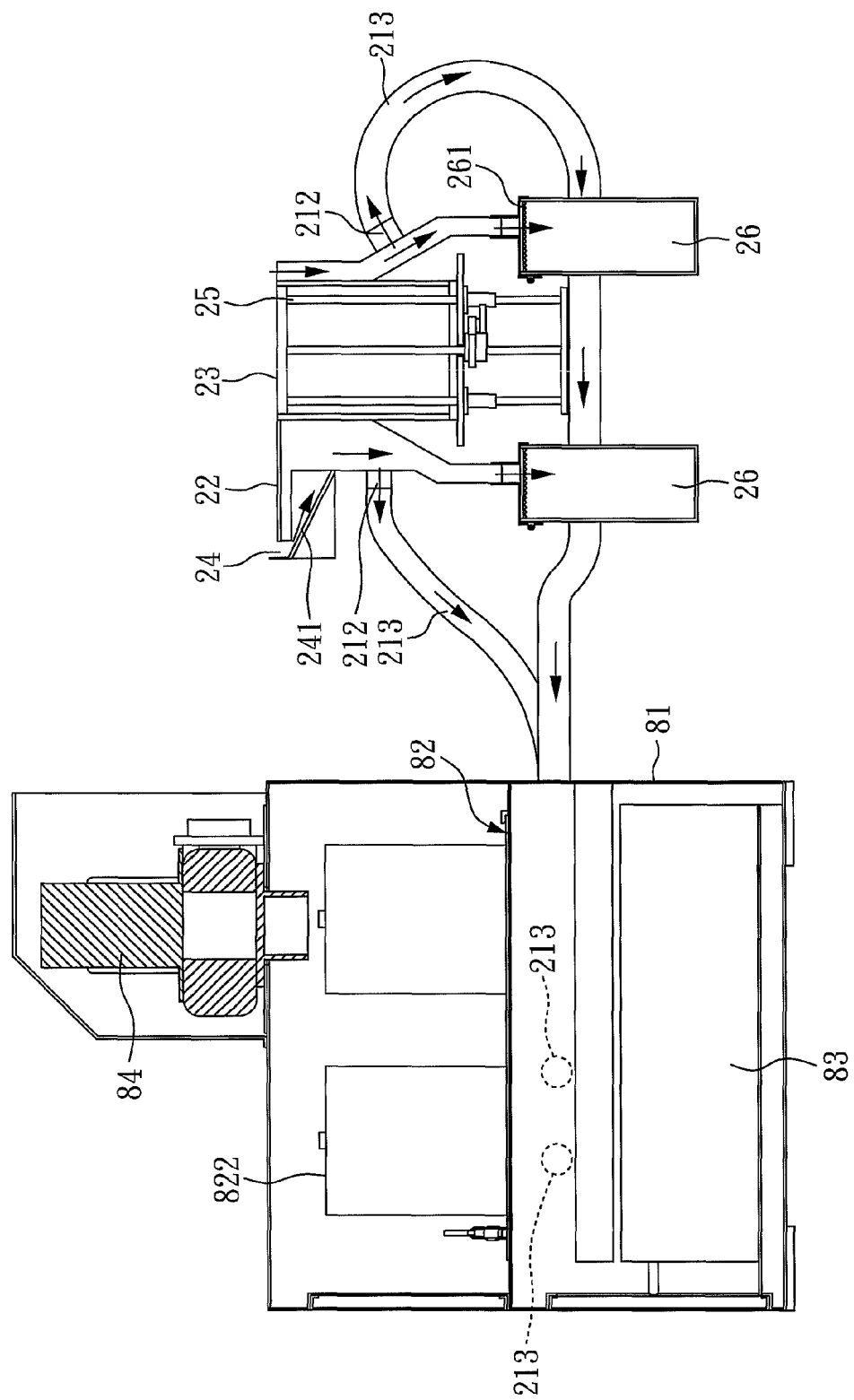
FIG. 4C shows a view of recycling the remaining powder in the construction tank system.
Figure 9:
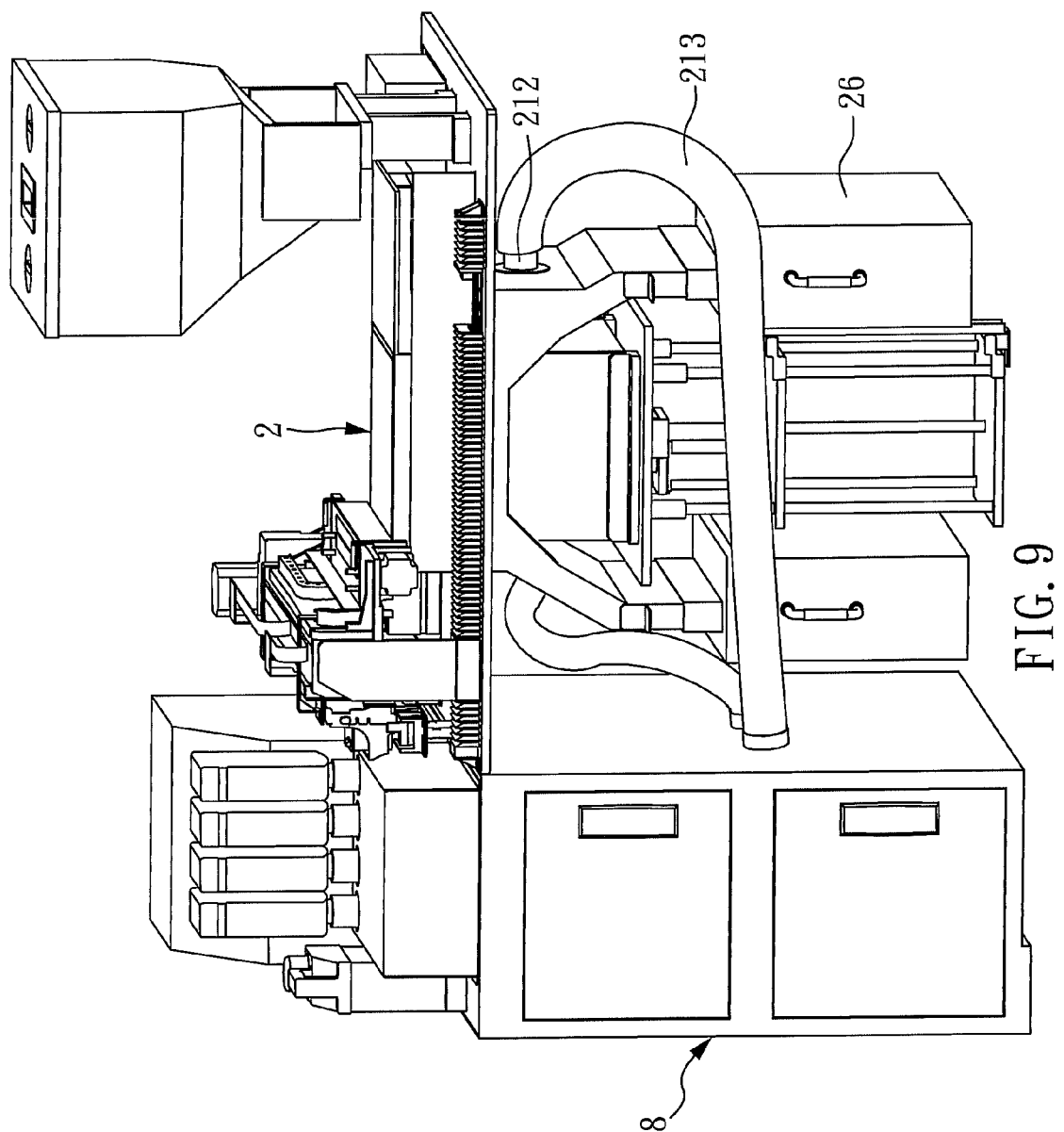
FIG. 9 shows a view of the connection between the powder auto-filtrating and recycling device and the three-dimensional object-forming apparatus.

Hence, after the powder of the in-batches powder-rationing tank system 1 drops in the printing powder-applying system 3 and then onto the powder-loading platform 22, the printing powder-applying system 3 can push the construction powder "a" towards the construction-forming area 23 and apply it evenly on the surface of the construction-forming area 23 for subsequent inkjet-printing. During the powder application, the redundant or disturbed (under inkjet-printing) construction powder "a" can directly drop in the surrounding dropping-powder area 24. As shown in FIG. 4C, the redundant or disturbed construction powder "a" is able to drop on the incline structures 241 of the surrounding dropping-powder area 24 and be leaded along the inclines towards the inside of the remaining powder auto-collection area 26 for auto-recycling and reuse. Furthermore, as shown in FIG. 4B, it is a structural view of the partial remaining powder auto-collection area of the construction tank system. The top inlet of the remaining powder auto-collection area 26 is provided with a filter net 261 and a vibrator 262. The mesh size of the filter net 261 can be regulated according to the particle size of the construction powder "a". The remaining powder can be filtrated by the filter net 261 through the vibration of the vibrator 262 and then recycled for reuse. As shown in FIGS. 4C and 9, the base platform 21 of the construction tank system 2 further includes several exhauster areas 212 and pipes 213. The exhauster areas 212 are connected to the powder auto-filtrating and recycling device 8 by the pipes 213. The disturbed construction powder "a" dropping on the incline structures 241 of the surrounding dropping-powder area 24 can be drawn by the exhauster areas 212 connected to the powder auto-filtrating and recycling device 8 via the pipes 213 and filtrated by the powder auto-filtrating and recycling device 8 for recycling and reuse.

Figure 5A:
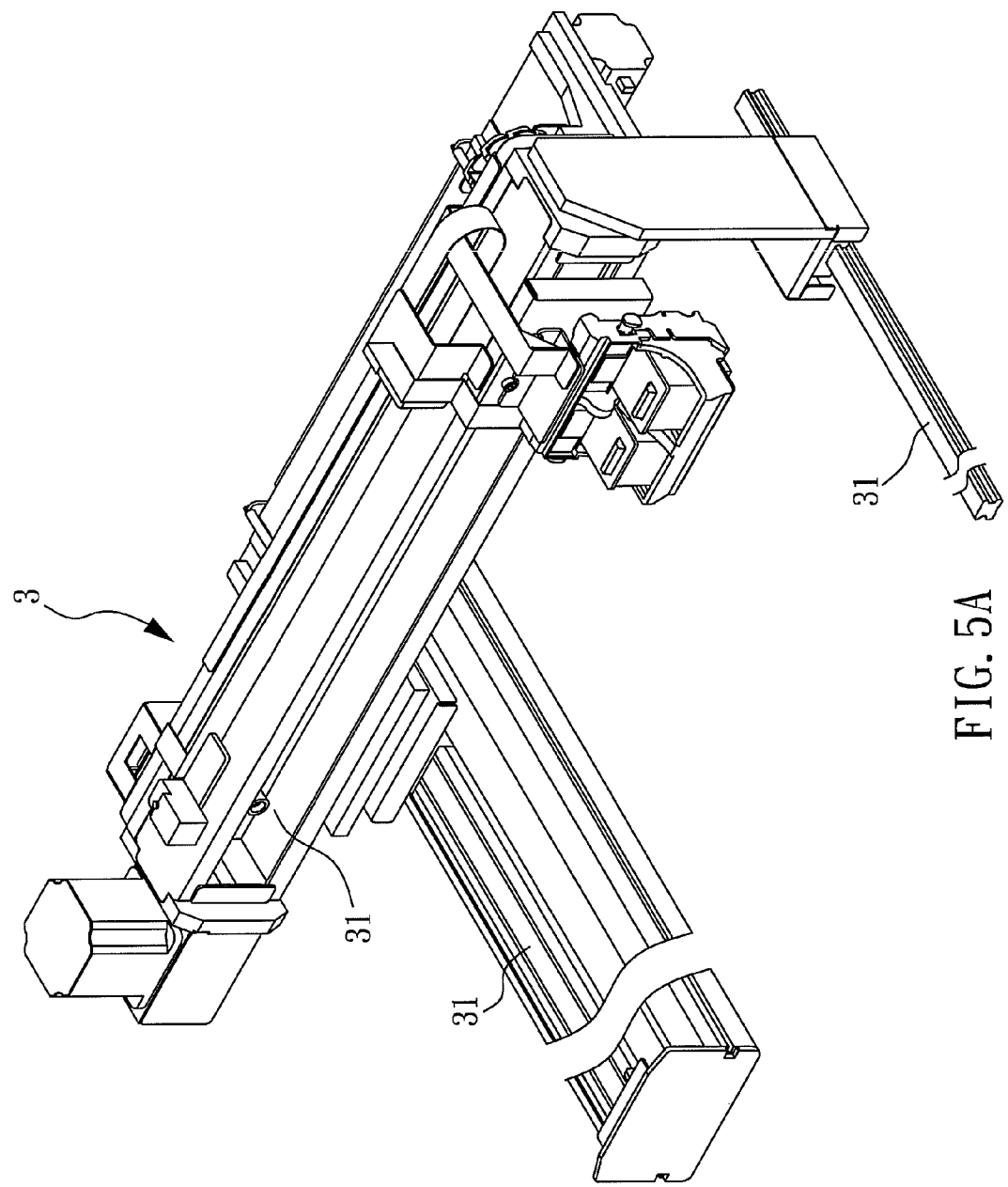
FIG. 5A shows a structural view of the printing powder-applying system.
Figure 5B:
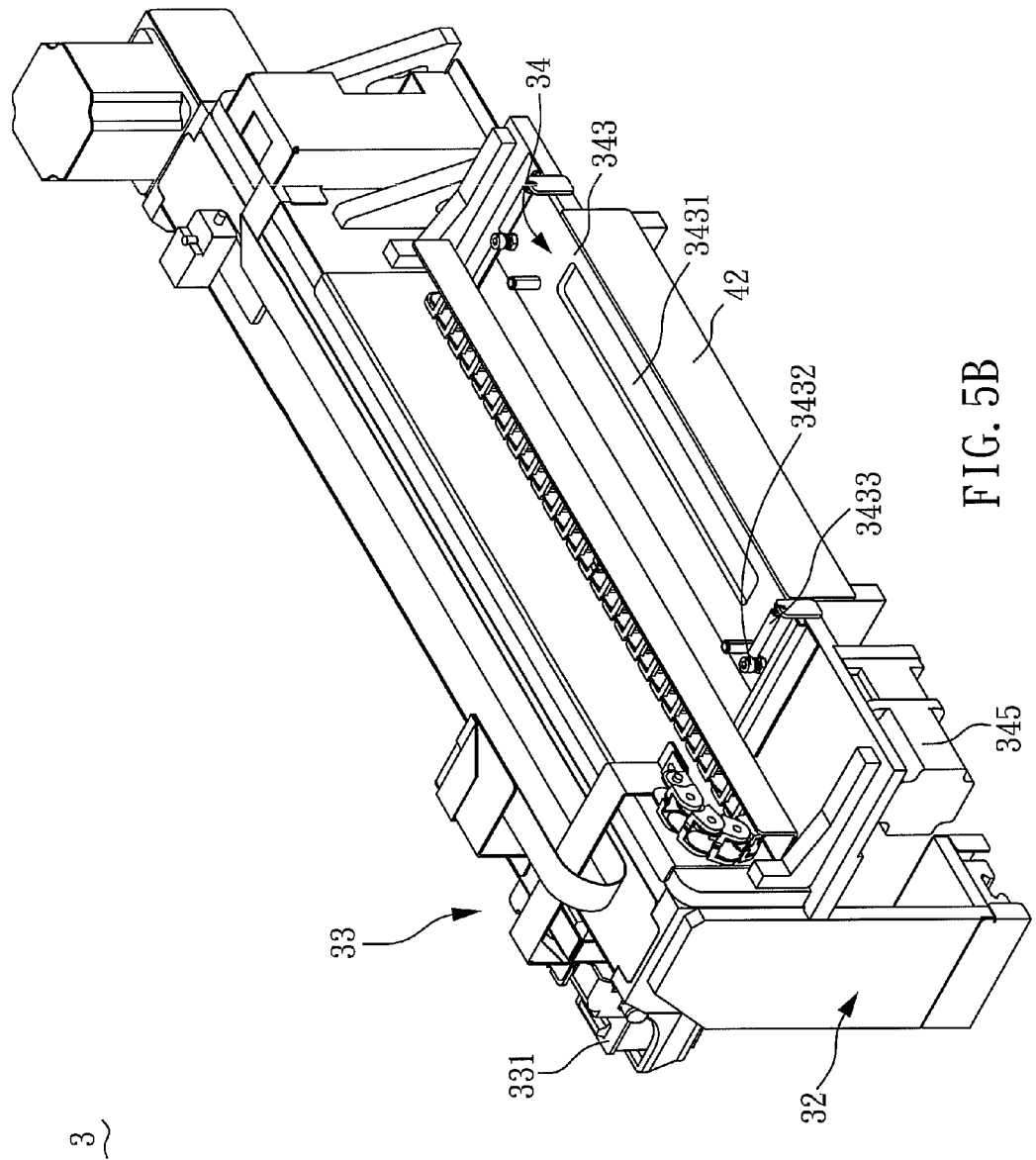
FIG. 5B shows a structural view of the printing module of the printing powder-applying system.
Figure 5C:
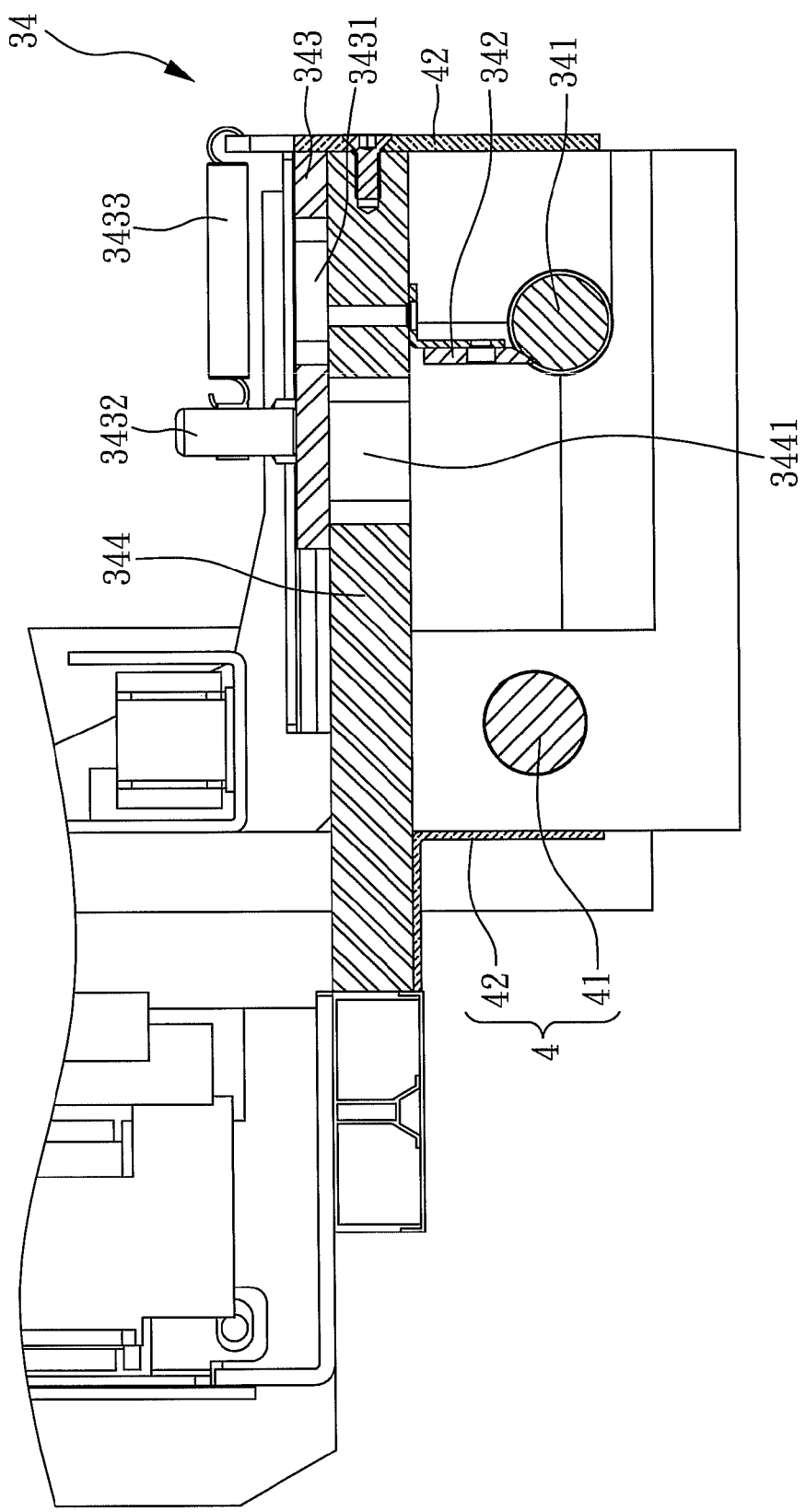
FIG. 5C shows a cross-sectional view of FIG. 5B.

With reference to FIGS. 2, 5A, 5B, and 5C, FIG. 5A is a structural view of the printing powder-applying system; FIG. 5B is a structural view of the printing module in the printing powder-applying system; and FIG. 5C is a cross-sectional view of FIG. 5B. As shown in FIGS. 2, 5A, 5B, and 5C, the printing powder-applying system 3 is installed on the construction tank system 2 and movable left and right so as to be close to a side of the in-batches powder-rationing tank system 1. When the powder is supplied, the printing powder-applying system 3 is moved toward and under the in-batches powder-rationing tank system 1 to make the construction powder "a" in the in-batches powder-rationing tank system 1 drop in the printing powder-applying system 3 for subsequent powder application.

The printing powder-applying system 3 includes a driving component 31, a movement base 32, a printing module 33, and a powder-applying device 34. The driving component 31 includes a drive motor, a ball screw, and a linear slide, and so on. The movement base 32 is mounted on the construction tank system 2 and moved crosswise by the driving component 31, thereby moving the movement base 32. The printing module 33 is installed on the movement base 32 and moved back and forth by the driving component 31. The displacement routes of the printing module 33 and the movement base 32 are perpendicular. On the printing module 33, at least one printing cartridge 331 is provided and used to inkjet-print an adhesive and color liquid. The powder-applying device 34 mainly includes a powder-applying roller 341, a cleaning scraper 342, a first board 343, a second board 344, and a motor 345. The powder-applying roller 341 is rotated by the motor 345. The cleaning scraper 342 is installed and spaced with a wiping gap above the powder-applying roller 341. The first board 343 and the second board 344 respectively have a first opening 3431 and a second opening 3441. On the surface of the first board 343, a blocking part 3432 is installed and held by an elastic member 3433 to control correspondence between the first opening 3431 of the first board 343 and the second opening 3441 of the second board 344. When the powder is not supplied, i.e. the printing powder-applying system 3 is distant from the in-batches powder-rationing tank system 1, the first opening 3431 of the first board 343 and the second opening 3441 of the second board 344 are not connected to each other to avoid disturbance of the construction powder "a" resulting in contamination of working environments. When the printing powder-applying system 3 moves towards in-batches powder-rationing tank system 1 to supply powder, the in-batches powder-rationing tank system 1 pushes the blocking part 3432 installed on the first board 343 to allow connection between the first opening 3431 of the first board 343 and the second opening 3441 of the second board 344 so that the construction powder "a" drops in the printing powder-applying system 3. After the powder supplement is completed, the printing powder-applying system 3 and the in-batches powder-rationing tank system 1 are separated, and the first board 343 is moved by the elastic recovery force of the elastic member 3433 back to the condition that the first opening 3431 of the first board 343 and the second opening 3441 of the second board 344 are not connected to each other.

When the in-batches powder-rationing tank system 1 outputs the construction powder "a" in a determined amount, the construction powder "a" drops in the printing powder-applying system 3 and onto the powder-loading platform 22 of the construction tank system 2. Then, the powder-applying roller 341 applies powder in a direction towards the construction-forming area 23 of the construction tank system 2 and thus the construction powder "a" is applied on the surface of the construction-forming area 23. Simultaneously, the cleaning scraper 342 can remove the powder on the powder-applying roller 341 to sufficiently utilize the construction powder "a" and prevent the construction powder "a" from adhering to the powder-applying roller 341.

In an environment of long-term printing, the time of the powder application is limited to that of drying the object. Each powder application costs 3 minutes for adhesion and drying of the powder, and thus the total time of forming the object is very long. Therefore, in order to achieve rapid drying, the three-dimensional object-forming apparatus of the present invention further includes a rapid drying heating system 4.

As shown in FIG. 5C, the rapid drying heating system 4 is disposed on a side of the printing powder-applying system 3 and moved together with the movement base 32. Heating can be performed by the rapid drying heating system 4 during the inkjet-printing of the printing module, and thus reduce more than half of the total time of forming the object. The rapid drying heating system includes a temperature sensor 41 and a protection partition 42. The temperature sensor 41 has a temperature-sensing member and a heat source generation member. The heat source generation member of the temperature sensor 41 generates radiant heat source to be conducted to the cleaning scraper 342. This means the cleaning scraper 342 has functions of not only removing the remaining powder but also preheating the powder. Thus, the time of the drying can considerably reduced in the former step of the inkjet-printing. The heating temperature can be accurately controlled by the energy of the preheating set in the temperature sensor 41 to achieve preheating, immediate drying posterior to inkjet-printing, and wiping powder. Therefore, the rapid drying heating system 4 can make the product taken out have the strength or precision of a complete product and its performance is like radiant heating so as to give stronger products and maintain the humidity of the printing environment. Thus, the humidity is unable to contaminate the powder to avoid inability of powder combination. The protection partition 42 is installed at two sides of the powder-applying device 34 to prevent a scald of an operator.

Figure 6:
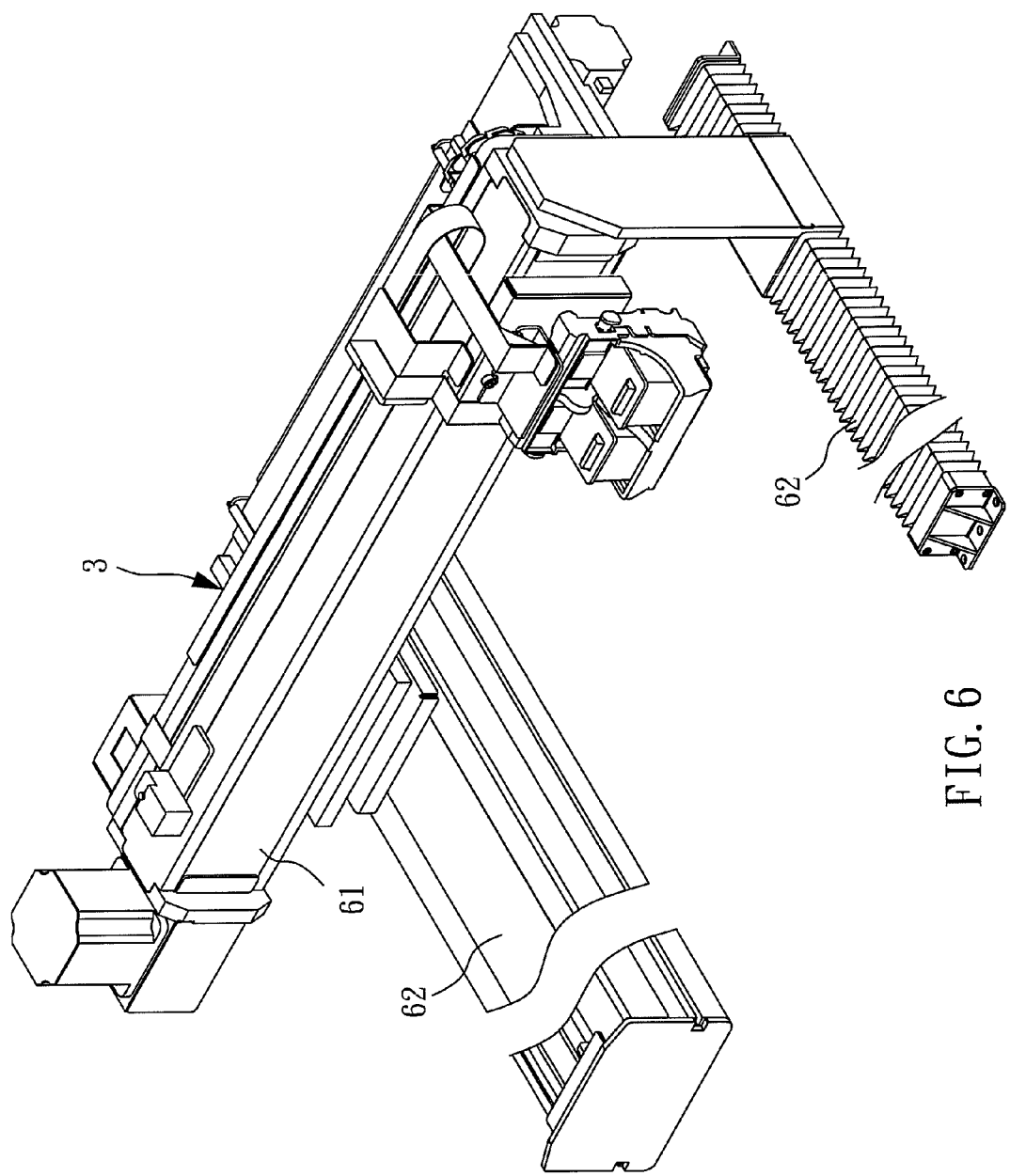
FIG. 6 shows a view of the dust-proof device.

When the product is taken out according to a conventional Rapid prototyping (RP) technique, powder disturbance always pollutes the working environments and thus frequent cleaning is required to maintain normal operation. However, the present invention reforms the drawbacks, and therefore a forming tank on the construction platform 231 and in the construction tank body 232 is designed to become removable so as to achieve no contamination of the powder and convenience of taking out the products. In addition, in order to prevent the adhesion of the disturbed construction powder "a" to the driving component 31 of the present invention (such as ball screws and linear slides) resulting the undesirable effects to lifespan and printing precision, the three-dimensional object-forming apparatus of the present invention further includes a dust-proof device 6. As shown in FIG. 6, the dust-proof device 6 includes a dust-proof plate 61 and an extendable dust-proof sheath 62 used to separate the powder therefrom and prevent the adhesion of the powder to the driving component 31 resulting in undesirable effects to lifespan and printing precision. The extendable dust-proof sheath 62 can extend or contract based on the movement of the printing powder-applying system 3 to achieve the dust-proof purpose.

Furthermore, the present invention continues using the conventional inkjet-printing technique. The printing adhesive needs to be properly stored during no printing, or the drying of the remaining adhesive in the print head or stored maintenance station may cause the poor performance of the subsequent inkjet-printing and is unable to form high-quality 3D products. In the convention inkjet-printing technique, volatile detergents are directly used to wash the print head adhered with powder particles, and this step may results in waste liquid produced in the washing splashes into the outlet and channel. However, the present invention utilizes a detergent to thoroughly clean the scraper of the maintenance device and the cleaned scraper is used to remove the remaining ink and powder on the surface of the print head. Therefore, the present invention has a good design of the printing maintenance device used to prevent the drying of the stored print head.

Figure 7A:
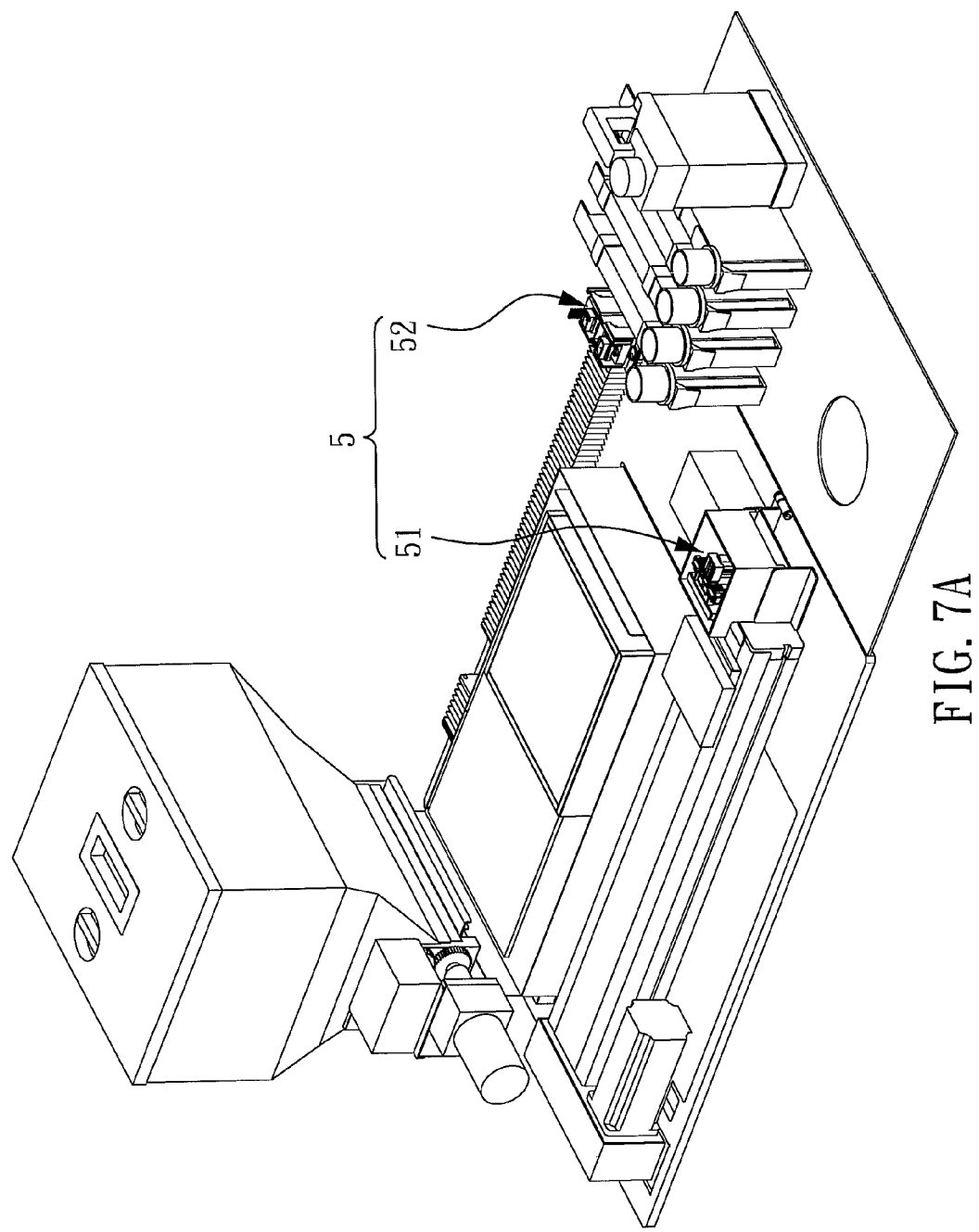
FIG. 7A shows a view of the printing maintenance device.

With reference to FIG. 7A, the printing maintenance device 5 of the three-dimensional object-forming apparatus includes a cleaning unit 51 and a sealing unit 52. In an example, the cleaning unit 51 and the sealing unit 52 are disposed on the base platform 21 of the construction tank system 2. After the inkjet-printing is completed by the print head, the cleaning unit 51 can remove the adhered powder and the remaining adhesive on the print head. The sealing unit 52 is used to seal the print head from being contaminated or dry.

Figure 7B:
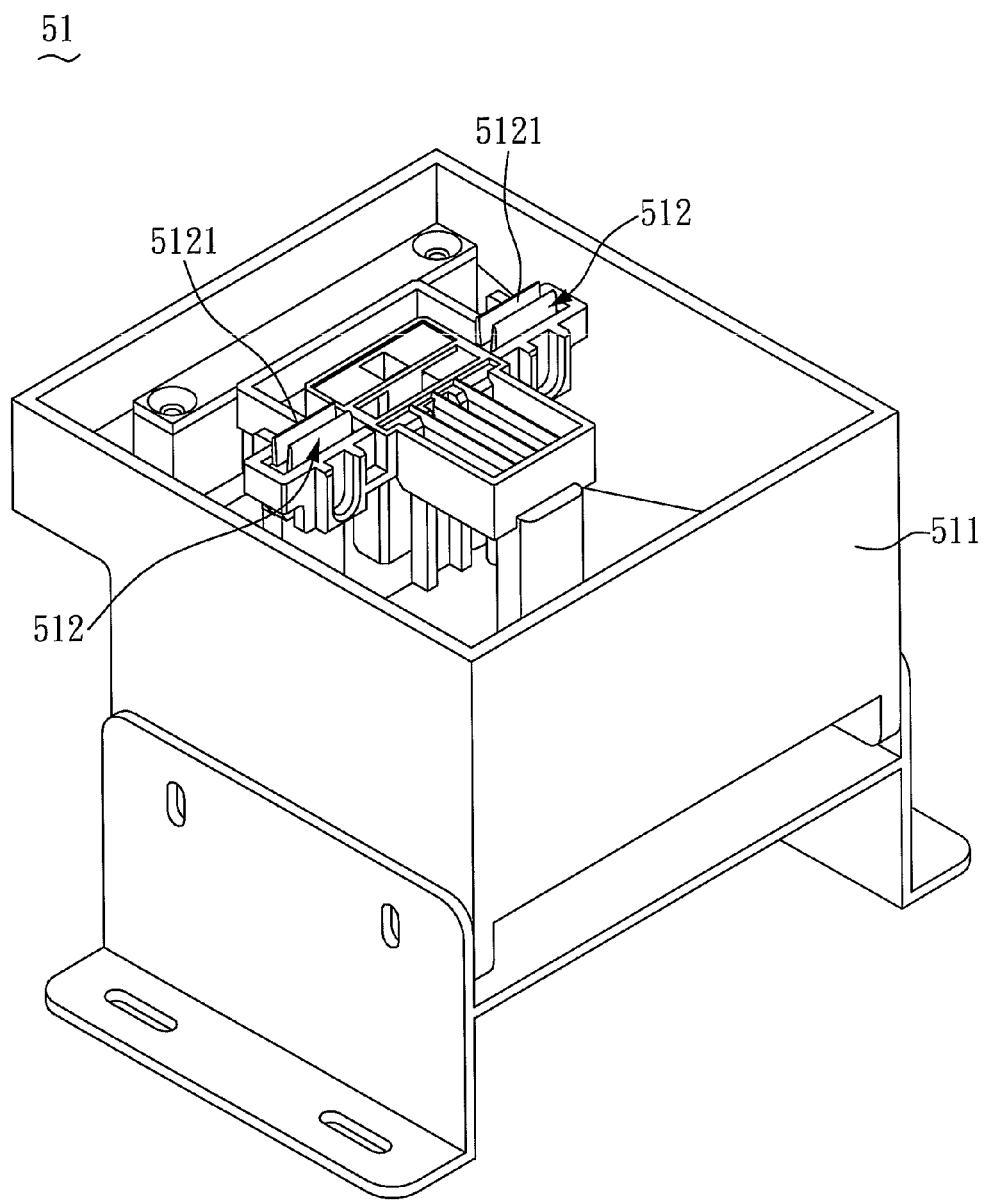
FIG. 7B shows a structural view of the cleaning unit.
Figure 7C:
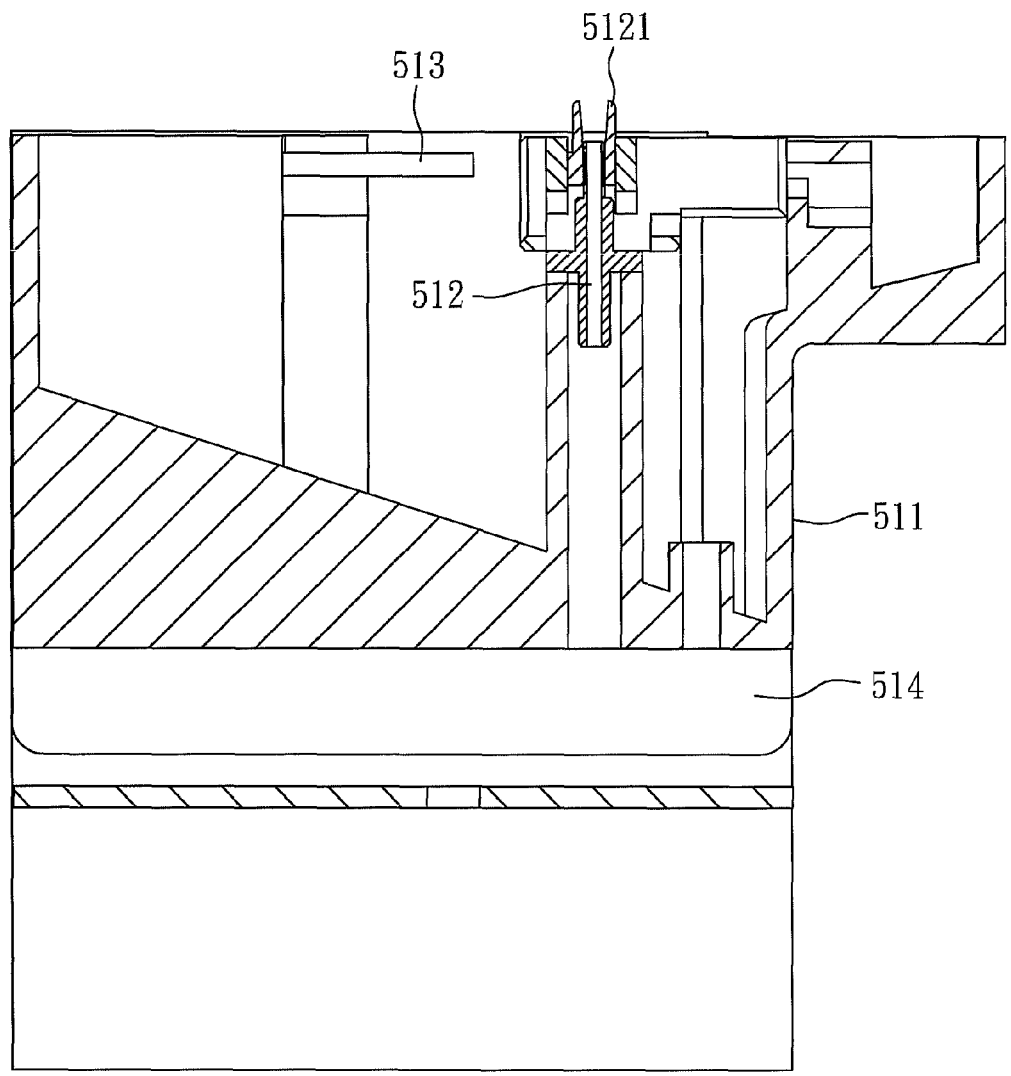
FIG. 7C shows a cross-sectional view of FIG. 7B.

With reference to FIGS. 7B and 7C, FIG. 7B shows a structural view of the cleaning unit of the present invention, and FIG. 7C shows a cross-sectional view of the cleaning unit of the present invention. As shown in the figures, the cleaning unit 51 has a base body 511, at least one set of scrapers 512, plural spraying members 513, and a waste-recycling zone 514. The scrapers 512 extend from the surface of the base body 511 outward and are disposed in correspondence to the printing cartridge. In the case that the printing module 33 has two printing cartridges 331, the cleaning unit 51 can have two set of scrapers 512 respectively disposed in correspondence to the two printing cartridges. Each set has two wipers 5121 but is not limited to two wipers 5121. Two wipers 5121 are disposed in parallel to each other and the wipers 5121 can be made of rubber. One of the spraying members 513 is arranged at a side of two sets of the scrapers 512, and the other thereof is arranged on the bottom of two sets of the scrapers 512. The spraying members 513 can clean the wipers 5121 by spraying a detergent. The waste-recycling zone 514 is set in the base body 511 and collects and drains out the sprayed waste containing the remaining adhesive and adhered powder.

When the inkjet-printing is completed by the print head, the printing cartridge is moved and arrives above the cleaning unit 51. When the print head passes through and contacts the wipers 5121, the wipers 5121 can immediately remove the remaining adhesive and adhered powder on the surface of the print head. Simultaneously, the spraying members 513 sprays the detergent to clean the wipers 5121 adhered with the remaining adhesive and powder to maintain the cleaning of the print head and the printing quality.

Figure 7D:
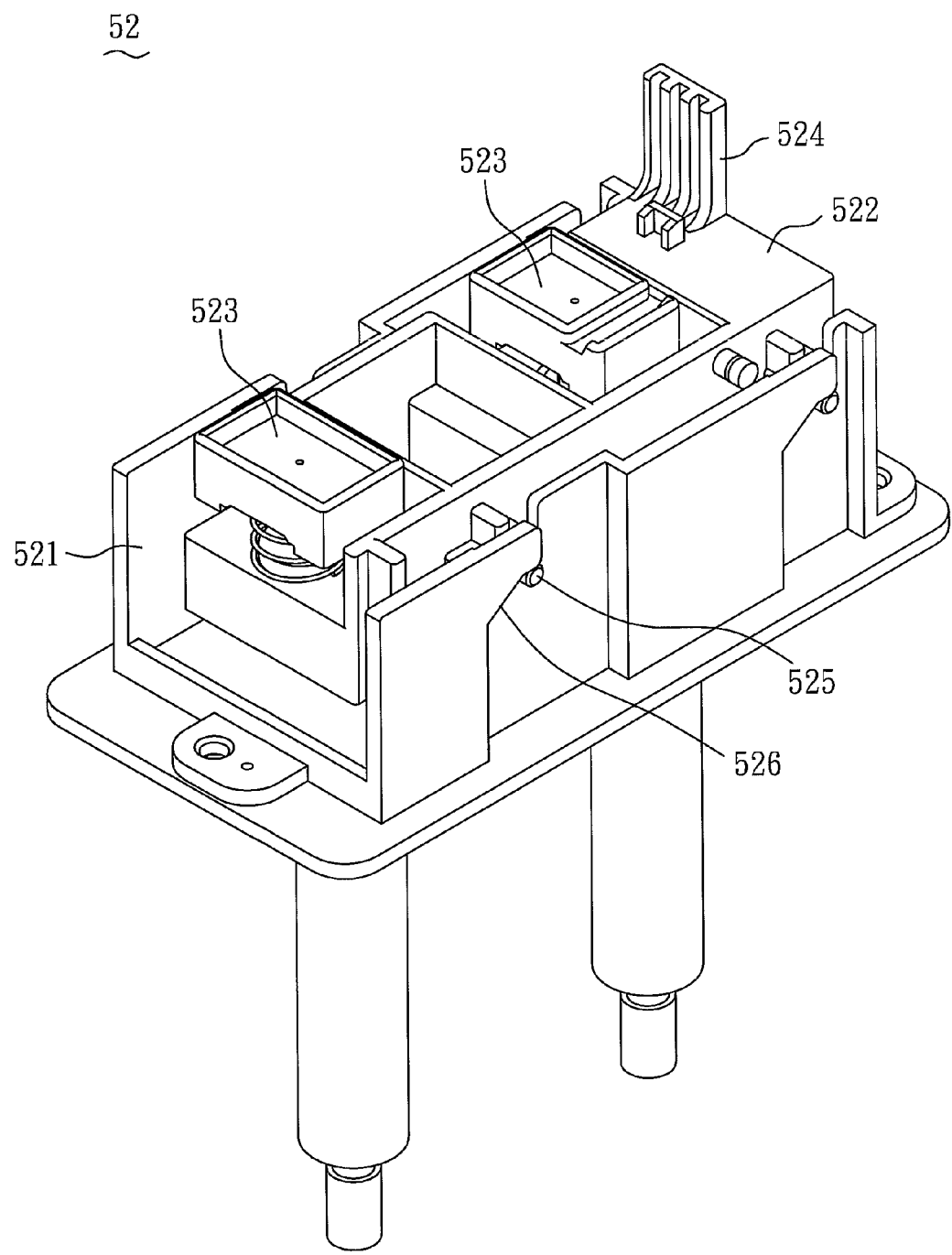
FIG. 7D shows a structural view of the sealing unit.

With reference to FIG. 7D, it shows a structural view of the sealing unit of the present invention. As shown in the figures, the sealing unit 52 mainly includes a foundation base 521, a sliding base 522, and a sealing part 523. The sliding base 522 is installed on the foundation base 521. The sealing part 523 is disposed on the sliding base 522 and partially protrudes from the top surface of the sliding base 522. The sealing part 523 is used to seal the print head of the printing cartridge and separates the print head from the contact of air so as to prevent the drying of the adhesive from blocking the outlet of the print head, and to avoid that the print head is contaminated by the exterior powder. The location and shape of the sealing part is set in correspondence to the print head of the printing cartridge. Hence, the number of the sealing part is changed in correspondence to that of the printing cartridge and not limited by two sealing parts shown in the figures of the present example.

Furthermore, the sliding base 522 has a blocking member 524 and at least one apex pin 525. The blocking member 524 extends upwards from the surface of the sliding base 522. The apex pin 525 protrudes from a lateral of the sliding base 522 and is disposed in a route slideway 526 on a lateral of the foundation base 521. When the inkjet-printing is completed by the printing module 33, a supporting frame of the printing cartridge goes back to a position above the sealing unit 52. During the homing, the supporting frame of the printing cartridge contacts the blocking member 524 on the sliding base 522, and then is moved forwards to push the blocking member 524. Thus, the apex pin 525 on the lateral of the sliding base 522 is moved along the route slideway 526, and the height of the sealing part 523 can be increased as the movement of the sliding base 522, resulting in that the sealing part 523 wraps the inkjet-print head of the printing cartridge. Hence, the inkjet-print head can be sealed in the sealing part 523 to avoid the contamination or drying of the inkjet-print head and further elongate the lifespan of the inkjet-print head.

In the conventional inkjet-printing technique, the liquid supply is achieved by the siphon principle. Siphoning is a hydrodynamic phenomenon and achieved without a pump. A tube in an inverted U shape, so-called as a siphon, is full of liquid in a higher position and has an outlet at a lower position. In this structure, a liquid pressure difference is present between the both ends of the tube and can make the liquid climb over the highest position in the tube, and then flow out from the outlet. The phenomenon of siphoning is acted by universal gravitation. In the conventional RP machine, if a successive ink-supplying system is not provided, the amount of the supplied adhesive is insufficient, resulting in being unable to print, or the printing back pressure changes with the height of the remaining ink in the ink cartridge and thus influences the quality of the printing, leading to the variation of the printing quality and the waste of the materials and time unable to be saved. By contrast, the present invention employs a device that successively supplies the ink and maintains constant back pressure to supply the adhesive in a large amount required during the formation to achieve the perfect formation.

Figure 8:
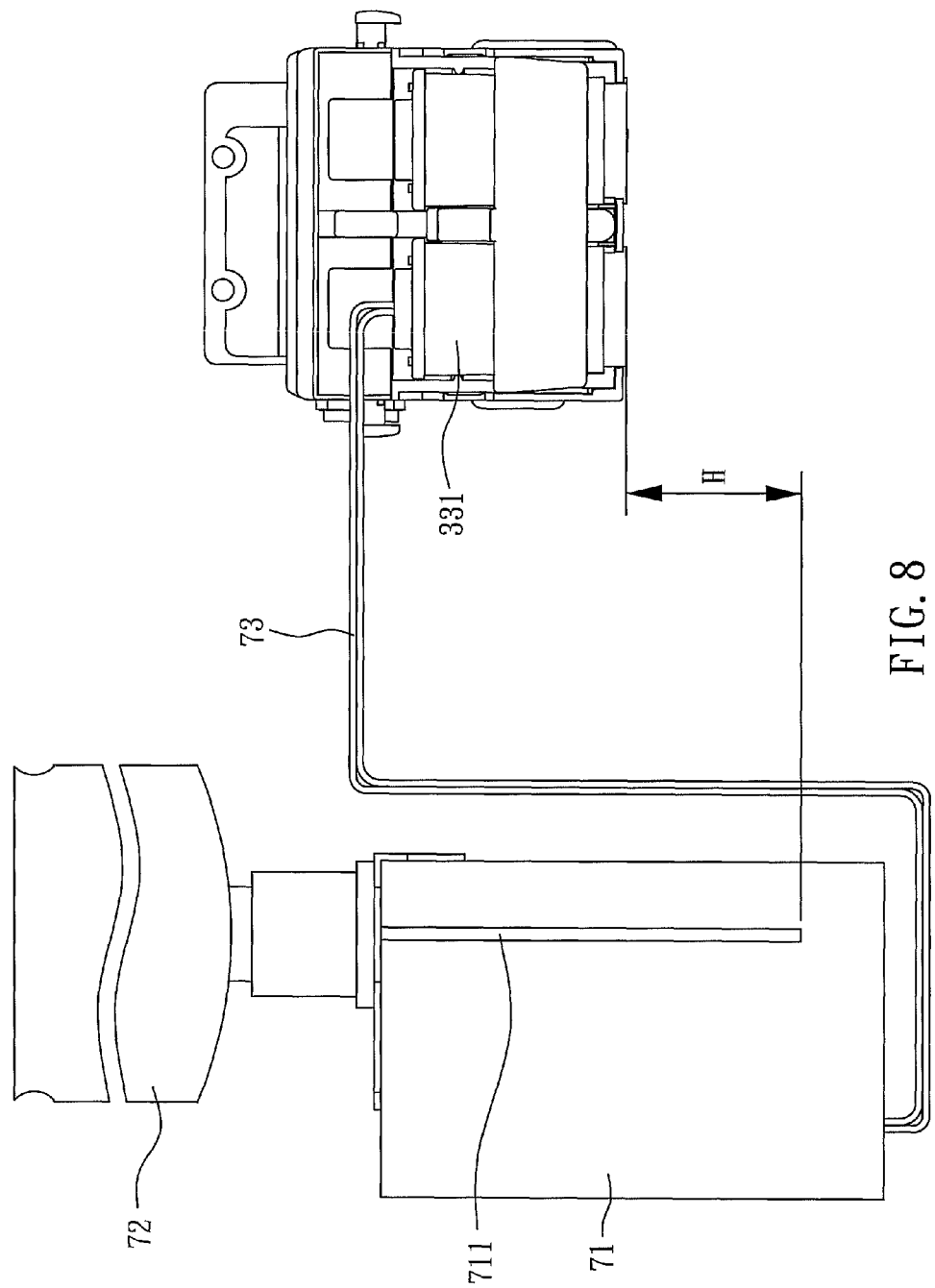
FIG. 8 shows a view of the liquid supplying in the successive liquid-supplying device.

With reference to FIGS. 2 and 8, the three-dimensional object-forming apparatus of the present invention further includes a successive liquid-supplying device 7 containing plural liquid-supplying containers 71 and filling containers 72. The liquid-supplying containers 71 can be provided with the removable filling containers 72. Also, the liquid-supplying containers 71 is installed near the standby position of the printing module 33 for the storage of the adhesive required by the inkjet-printing of the printing module 33. Besides, the lowest position of an air-pipe 711 inside the liquid-supplying containers 71 and a nozzle at the bottom of the printing cartridge 331 are spaced with a height difference of "H". The liquid-supplying containers 71 and the printing cartridge 331 are connected with the connective pipes 73 to achieve suction and make the adhesive stored in the liquid-supplying containers 71 inject into the printing cartridge. Through successive supply of the adhesive, the printing module can inkjet-print successively on the construction powder "a" for a long term of time. In an example, the liquid-supplying containers 71 are movable liquid-supplying containers.

During the printing construction, the redundant construction powder "a" is collected from the surrounding dropping-powder area 24 of the construction tank system 2 into the remaining powder auto-collection area 26. However, during powder application or inkjet-printing, light or small dust powder may float into the working space. Besides, the construction powder "a" dropping from the surrounding dropping-powder area 24 may hits partial devices to induce rebounds of the dust powder, and that dropping in the remaining powder auto-collection area 26 may also rebound to cause the disturbance of the dust powder, leading to the contamination inside the working space. Hence, the three-dimensional object-forming apparatus of the present invention can further employ the powder auto-filtrating and recycling device to promote the recycling efficiency of the dust powder so that the three-dimensional object-forming apparatus is able to normally operate under an environment without any contamination. The following are illustration for the related components.

With reference to FIG. 9, it shows a view of the connection between the powder auto-filtrating and recycling device and the three-dimensional object-forming apparatus. As shown in the figure, the powder auto-filtrating and recycling device 8 is connected to the exhauster areas 212 of the construction tank system 2 via the pipe 213 and used to suck and filtrate the disturbed dust powder during the operation of the three-dimensional object-forming apparatus.

Figure 10:
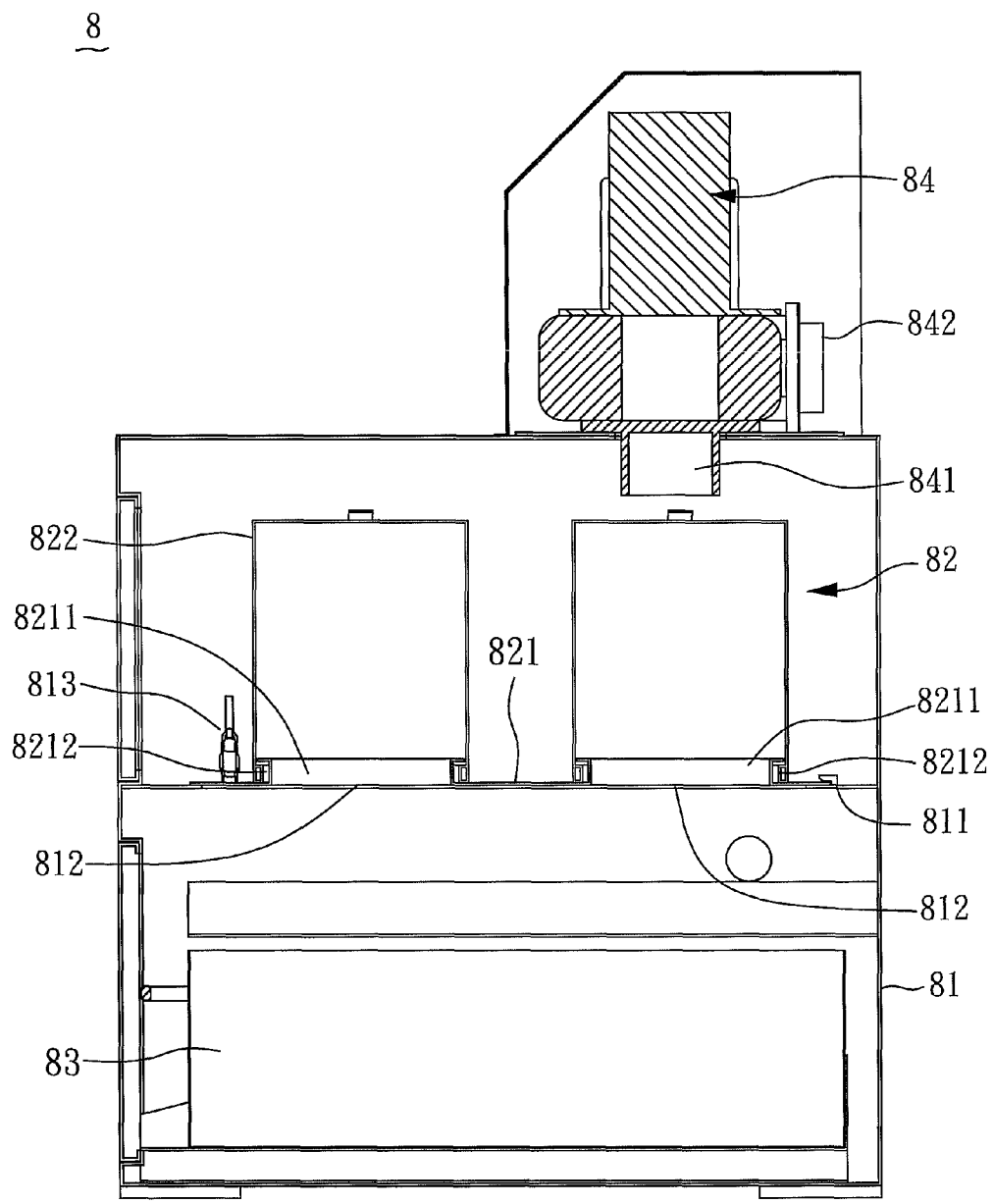
FIG. 10 shows a cross-sectional view of the powder auto-filtrating and recycling device.

With reference to FIG. 10, it shows a cross-sectional view of the powder auto-filtrating and recycling device. As shown in the figure, the powder auto-filtrating and recycling device 8 mainly includes a casing 81, a powder filtration unit 82, a recycling member 83, and a draught device 84. A spacer 811 is provided inside the casing 81 and has an opening 812 connecting upwards and downwards. The bottom of the spacer 811 is connected to the exhauster areas 212 of the construction tank system 2 via the pipe 213. The powder filtration unit 82 includes a detachable chassis 821 and at least one dust-collecting bag 822. The chassis 821 is installed above the spacer 811 and fastened by a toggle clamp 813. The bottom of the chassis 821 corresponding to the opening 812 of the spacer 811 has an opening 8211 and a collar 8212 is disposed on the circumference of the opening 8211. The dust-collecting bag 822 can be non-woven fabric material but not limited thereto. In the present example, the dust-collecting bag 822 is actually shown as a barrel-like structure and can be looped on the collar 8212 to seal the members (not shown in the figure, such as a tensional zoster) for orientation and seal the opening 8211 of the chassis 821.

The recycling member 83 of the present invention is a tank structure and disposed in the space under the spacer 811. The draught device 84 can be a blower disposed above the casing 81 and having an inlet 841 and an outlet 842. The inlet 841 is connected to the inside of the casing 81. During the operation of the draught device 84, air suction and exhaustion can be accomplished respectively via the inlet 841 and the outlet 842, resulting in the formation of negative pressure inside the casing 81. Thus, during the operation of the draught device 84, the dust powder disturbed by the operation of the three-dimensional object-forming apparatus can be sucked into the inside of the casing 81 and then separated by the powder filtration unit 82 from being sucked into the draught device 84 so as to keep the lifespan of the draught device 84 normal. After the operation of the draught device 84 stops, the dust powder separated by the powder filtration unit 82 can naturally drop downwards into the recycling member 83 to achieve absolutely dust-proof purpose and that the dust powder can be auto-recycled and reused.

With reference to FIG. 2, the three-dimensional object-forming apparatus of the present invention further includes a print quality detection member 9. In the present example, ground glass is used as the print quality detection member 9. When the coarse surface of the ground glass is wetted by water, the indentations are filled with water and a smooth water film forms thereon. Thus, when light passes through the ground glass, regular refractions occur, thereby observing whether the pattern inkjet-printed by the inkjet-print head is normal and determining whether the inkjet-print head is blocked. If the inkjet-print head is considered blocked, the printing module needs cleaning first. On the contrary, if the inkjet-print head is considered not blocked, the printing module can subsequently inkjet-print on the construction-forming area.

In conclusion, the three-dimensional object-forming apparatus of the present invention has a quantitative powder-supplying tank system to regulate the corresponding times between the cavities of the in-batches rationing roller under rolling and the dropping-powder opening according to requirements of different powder-application thicknesses so as to control the output amount of the construction powder. Therefore, redundant construction powder drawn in the powder collection tank can be reduced to avoid the waste of the construction powder and decrease the production costs. In addition, each cavity of the in-batches rationing roller has a plurality of compartments, and the capacity of the compartments increases from the center of the cavities to the both sides thereof so as to achieve even powder application and improve the drawback of powder deficiency at the both sides.

Besides, the three-dimensional object-forming apparatus of the present invention further comprises a heating device used to heat during the printing of the printing module to accelerate the combination between the adhesive and the construction powder and reduce one-third to half time of forming a three-dimensional object. The three-dimensional object-forming apparatus of the present invention further comprises a successive liquid-supplying device which can successively supply an adhesive into the printing cartridge to make the printing module inkjet-print on the construction powder for a long term of time.

Furthermore, the three-dimensional object-forming apparatus of the present invention has a dust-proof device for a driving component to prevent the contamination of the disturbed powder during the powder application and inkjet printing so that the apparatus and components of the three-dimensional object-forming apparatus all can be kept anytime in a normal operation and achieve absolute dust-proofing overall.

Meanwhile, the three-dimensional object-forming apparatus of the present invention is provided with an inkjet-print head maintenance device which comprises a cleaning unit and a sealing unit. After the inkjet-printing operation is completed by the inkjet-print head, the inkjet-print head can be completely cleaned by the scrapers of the cleaning unit and sealed in the sealing part of the sealing unit to achieve thorough anti-contamination and anti-drying of the inkjet-print head.

Moreover, the three-dimensional object-forming apparatus of the present invention has the design of the print quality detection, in which ground glass is used as a print quality detection member to real-timely observe whether the pattern inkjet-printed by the inkjet-print head is normal and determine whether the inkjet-print head is blocked so as to clean the inkjet-print head in time and keep the print quality.

Therefore, the three-dimensional object-forming apparatus of the present invention has high industrial applicability and can be filed according to the Law.

Although the present invention has been explained in relation to its preferred embodiment, it is to be understood that many other possible modifications and variations can be made without departing from the scope of the invention as hereinafter claimed.

What is claimed is:

1. A three-dimensional object-forming apparatus, comprising:
    an in-batches powder-rationing tank system comprising at least one powder-supplying tank, an in-batches rationing roller, and a closing device, wherein the powder-supplying tank is used to store construction powder; the in-batches rationing roller provides the construction powder in batches of which each is applied in a required amount, and the closing device controls the dropping application of the rationed construction powder and prevents a trace of the construction powder from leaking out of the inside of the powder-supplying tank;
    a construction tank system comprising a base platform, a powder-loading platform, a construction-forming area, a surrounding dropping-powder area, an elevator apparatus, and a remaining powder auto-collection area, wherein the construction-forming area comprises a construction platform and a construction tank body, wherein the construction platform is used for the loadings of the construction powder and a three-dimensional object formed by stacking layer by layer, secured on the elevator apparatus, and moved up and down inside the construction tank body by the elevator apparatus; the surrounding dropping-powder area is set around the powder-loading platform and the construction-forming area to collect remainder of the construction powder; and the remaining powder auto-collection area is connected to a bottom space of the surrounding dropping-powder area and allows the reminder of the construction powder to be filtrated by a sieve for recycling;
    a printing powder-applying system comprising a driving component, a movement base, a printing module, and powder-applying device, wherein the movement base is set across the construction tank system and moved transversely by the driving component; the printing module is mounted on the movement base, moved back and forth by the driving component for inkjet-printing, and provided with at least one printing cartridge thereon to inkjet-print liquid to the construction powder on the construction platform of the construction tank system for formation; the powder-applying device is disposed on a side of the printing module to receive the rationed construction powder dropped in the powder-supplying tank of the in-batches powder-rationing tank system and restricted on the powder-loading platform of the construction tank system, and provided with a powder-applying roller to evenly apply the construction powder of the powder-loading platform onto the construction platform for inkjet-printing formation;
    a rapid drying heating system provided with a temperature sensor for heating while the printing module of the printing powder-applying system is inkjet-printing so as to reduce the time during the formation of the construction powder;
    a printing maintenance device comprising a cleaning unit and a sealing unit, wherein the cleaning unit cleans remaining liquid and adhered powder of the print head on the printing cartridge of the printing module, and the sealing unit is used to seal the print head from being polluted or dried;
    a dust-proof device comprising a dust-proof plate and an extendable dust-proof sheath to separate the driving component of the printing powder-applying system from dust;
    a successive liquid-supplying device comprising liquid-supplying containers, filling containers, and connective pipes, wherein the filling containers provide supplementary inkjet-printing liquid to the liquid-supplying containers, and the liquid-supplying containers and the printing cartridge of the printing module are communicated and drawn by the connective pipes so as to form inkjet-printing operation of successive liquid supplement; and
    a powder auto-filtrating and recycling device used to draw and filtrate the floating construction powder while operation for recycling.

2. The three-dimensional object-forming apparatus as claimed in claim 1, wherein cavities are set in the in-batches rationing roller of the in-batches powder-rationing tank system, and each of the cavities has compartments and the powder-containing amount of the compartments increase from a center to both sides of the cavities.

3. The three-dimensional object-forming apparatus as claimed in claim 1, wherein a baffle plate, a first roller, and a second roller are arranged inside the powder-supplying tank of the in-batches powder-rationing tank system, and a dropping-powder opening and a dropping-powder channel are formed on a bottom of the powder-supplying tank, wherein a lateral of the baffle plate and the dropping-powder opening are spaced out a dropping-powder zone apart to allow the construction powder inside the powder-supplying tank to be disturbed by first and second rollers to drop onto the dropping-powder zone, and then to be successfully output by the dropping-powder channel.

4. The three-dimensional object-forming apparatus as claimed in claim 3, wherein the closing device of the in-batches powder-rationing tank system has a board, an elastic member, and a retention member, wherein the board has an opening and a fixing member; when the board is pushed, the opening is connected to the dropping-powder opening to make the rationed construction powder output; one terminal of the elastic member is connected to the fixing member and the other terminal thereof is connected to the retention member; and when the board is not pushed, the opening is not connected to the dropping-powder opening to prevent minor leakage of the construction powder from the powder-supplying tank.

5. The three-dimensional object-forming apparatus as claimed in claim 3, wherein the in-batches rationing roller of the in-batches powder-rationing tank system has a plurality of cavities for receiving the construction powder, and when one of the cavities corresponds to the dropping-powder opening, the construction powder received in the cavities is output via the dropping-powder opening.

6. The three-dimensional object-forming apparatus as claimed in claim 1, wherein the in-batches powder-rationing tank system controls the output amount of the construction powder according to the corresponding times between the cavities of the in-batches rationing roller under rolling and the dropping-powder opening.

7. The three-dimensional object-forming apparatus as claimed in claim 1, wherein the surrounding dropping-powder area of the construction tank system has at least one incline structures for guiding and collecting the remaining construction powder dropped thereon into the remaining powder auto-collection area.

8. The three-dimensional object-forming apparatus as claimed in claim I, wherein a detection window made of a transparent material is disposed on the construction platform and on a side wall of construction tank body in the construction-forming area of the construction tank system, and used to observe whether waste powder is accumulated on the elevator apparatus to benefit removal of the waste powder by a user.

9. The three-dimensional object-forming apparatus as claimed in claim 1, wherein a filter net and a vibrator are installed in the remaining powder auto-collection area of the construction tank system and used to filtrate the remaining construction powder dropped therein for recycling.

10. The three-dimensional object-forming apparatus as claimed in claim 9, wherein a mesh size of the filter net is adjusted according to particle size of the construction powder.

11. The three-dimensional object-forming apparatus as claimed in claim 1, wherein the powder-applying device of the printing powder-applying system further comprises a cleaning scraper installed above the powder-applying roller and spaced with a wiping gap therebetween, to remove the construction powder on the powder-applying roller.

12. The three-dimensional object-forming apparatus as claimed in claim 1, wherein the powder-applying device of the printing powder-applying system further comprises a first board and a second board, wherein the first and second board respectively has a first opening and a second opening; the first and second openings are connected with each other to make the construction powder dropped restrictively in the powder-loading platform of the construction tank system so that the construction powder on the powder-loading platform is applied evenly on the construction platform by the powder-applying roller for inkjet-printing.

13. The three-dimensional object-forming apparatus as claimed in claim 12, wherein the first board is provided with a blocking part and an elastic member, wherein the blocking part is held by the elastic member and controls a displacement of the first opening and a non-connection with the second opening in order to avoid disturbance of the construction powder resulting in contamination of working place during powder application.

14. The three-dimensional object-forming apparatus as claimed in claim 1, wherein the temperature sensor of the rapid drying heating system has a temperature-sensing member and a heat source generation member to provide the construction powder with radiant heat source.

15. The three-dimensional object-forming apparatus as claimed in claim 1, wherein the rapid drying heating system further comprises a protection partition disposed on both sides of the powder-applying device.

16. The three-dimensional object-forming apparatus as claimed in claim 1, wherein the cleaning unit of the printing maintenance device has a base body, at least one set of scrapers, a plurality of spraying members, and a waste-recycling zone, wherein the spraying members are installed on a side or bottom of the scrapers and sprays a detergent to clean the scrapers, and the waste-recycling zone is set in the base body and collects and drains spraying wastes.

17. The three-dimensional object-forming apparatus as claimed in claim 1, wherein the sealing unit of the printing maintenance device comprises a foundation base, a sliding base, and a sealing part, wherein the sealing part is used to wrap the print head sealing the printing cartridge.

18. The three-dimensional object-forming apparatus as claimed in claim 1, wherein the powder auto-filtrating and recycling device comprises: a casing connected to the construction tank system by a pipe; a draught device mounted on the casing and connected with the casing to draw the construction powder disturbed within the construction tank system into the casing; a powder filtration unit comprising a detachable chassis and at least one dust-collecting bag installed in the casing and used to separate the drawn-in construction powder; and a recycling member installed in the casing and under the powder filtration unit to recycle the construction powder separated by the dust-collecting bag of the powder filtration unit.

19. The three-dimensional object-forming apparatus as claimed in claim 1, further comprising a print quality detection member used to determine whether the print head of the printing cartridge is blocked.

20. The three-dimensional object-forming apparatus as claimed in claim 19, wherein the print quality detection member is ground glass.

* * * * *